(12) United States Patent
Kanda et al.

(10) Patent No.: US 8,401,430 B2
(45) Date of Patent: Mar. 19, 2013

(54) ELECTRON EMITTING ELEMENT FOR ACCELERATING AND EMITTING ELECTRONS, AND USE OF ELECTRON EMITTING ELEMENT

(75) Inventors: Hirofumi Kanda, Osaka (JP); Tadashi Iwamatsu, Osaka (JP); Toshihiro Tamura, Osaka (JP); Hiroyuki Hirakawa, Osaka (JP); Yoshio Ichii, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 207 days.

(21) Appl. No.: 12/743,741

(22) PCT Filed: Nov. 20, 2008

(86) PCT No.: PCT/JP2008/071102
§ 371 (c)(1),
(2), (4) Date: May 19, 2010

(87) PCT Pub. No.: WO2009/066723
PCT Pub. Date: May 28, 2009

(65) Prior Publication Data
US 2010/0278561 A1 Nov. 4, 2010

(30) Foreign Application Priority Data

Nov. 20, 2007 (JP) .................................. 2007-300544
Nov. 19, 2008 (JP) .................................. 2008-295722

(51) Int. Cl.
*G03G 15/02* (2006.01)
(52) U.S. Cl. ........................................................ 399/168
(58) Field of Classification Search ................. 399/168, 399/50
See application file for complete search history.

(56) References Cited

U.S. PATENT DOCUMENTS 3,644,161 A 2/1972 Hall
(Continued)

FOREIGN PATENT DOCUMENTS

CN 1755889 A 4/2006
CN 1763885 A 4/2006
(Continued)

OTHER PUBLICATIONS

U.S. Appl. No. 12/956,136, filed Nov. 30, 2010, entitled "Electron Emitting Element, Method for Producing Electron Emitting Element, Electron Emitting Device, Charging Device, Image Forming Apparatus, Electron-Beam Curing Device, Image Display Device, Air Blowing Device, Cooling Device" (not yet published), Hiroyuki Hirakawa.

(Continued)

*Primary Examiner* — Quana M Grainger
(74) *Attorney, Agent, or Firm* — Nixon & Vanderhye, P.C.

(57) ABSTRACT

An electron emitting element (1) includes a substrate (2), an upper electrode (3), and a fine particle layer (4) sandwiched between the substrate (2) and the upper electrode (3). The fine particle layer (4) includes metal fine particles (6) with high resistance to oxidation, and insulating fine particles (5) larger in size than the metal fine particles (6). The electron emitting element (1) can steadily emit electrons not only in vacuum but also in the atmosphere. Further, the electron emitting element (1) can work without electric discharge so that harmful substances such as ozone, NOx, or the like are scarcely generated. Accordingly, degradation of the electron emitting element (1) due to oxidation does not occur. Therefore, the electron emitting element (1) has a long life and can steadily work continuously for a long period of time even in the atmosphere.

26 Claims, 15 Drawing Sheets

U.S. PATENT DOCUMENTS

| | | |
|---|---|---|
| 4,857,161 A | 8/1989 | Borel |
| 5,891,548 A | 4/1999 | Graiver |
| 5,962,959 A | 10/1999 | Iwasaki et al. |
| 6,023,124 A | 2/2000 | Chuman et al. |
| 6,130,503 A | 10/2000 | Negishi et al. |
| 6,166,487 A | 12/2000 | Negishi et al. |
| 6,462,467 B1 | 10/2002 | Russ |
| 6,626,724 B2 | 9/2003 | Yamamoto et al. |
| 6,628,053 B1 | 9/2003 | Den et al. |
| 6,803,707 B2 | 10/2004 | Ishiwata et al. |
| 6,844,664 B2 | 1/2005 | Komoda et al. |
| 7,723,909 B2 | 5/2010 | Yamaguchi et al. |
| 8,110,971 B2 | 2/2012 | Hirakawa et al. |
| 2001/0017369 A1 | 8/2001 | Iwasaki et al. |
| 2001/0026123 A1 | 10/2001 | Yoneda |
| 2002/0070677 A1 | 6/2002 | Yamada et al. |
| 2002/0136896 A1 | 9/2002 | Takikawa et al. |
| 2003/0076023 A1 | 4/2003 | Komoda et al. |
| 2003/0102793 A1 | 6/2003 | Komoda et al. |
| 2004/0021434 A1 | 2/2004 | Yoneda |
| 2004/0046914 A1 | 3/2004 | Hirota |
| 2004/0150768 A1 | 8/2004 | Shimizu et al. |
| 2004/0197943 A1 | 10/2004 | Izumi |
| 2004/0201345 A1 | 10/2004 | Hirokado |
| 2004/0246408 A1 | 12/2004 | Ando |
| 2005/0181566 A1 | 8/2005 | Machida et al. |
| 2005/0212398 A1 | 9/2005 | Okano et al. |
| 2006/0012278 A1 | 1/2006 | Nanataki et al. |
| 2006/0061967 A1 | 3/2006 | Kim et al. |
| 2006/0065895 A1 | 3/2006 | Kusunoki et al. |
| 2006/0152138 A1 | 7/2006 | Hori et al. |
| 2006/0186786 A1 | 8/2006 | Iwamatsu et al. |
| 2006/0244357 A1 | 11/2006 | Lee |
| 2006/0284543 A1 | 12/2006 | Chung et al. |
| 2006/0291905 A1 | 12/2006 | Hirakawa et al. |
| 2007/0210697 A1 | 9/2007 | Tamura et al. |
| 2007/0222067 A1* | 9/2007 | Nanataki et al. ............. 257/734 |
| 2009/0091526 A1 | 4/2009 | Hirota |
| 2010/0196050 A1* | 8/2010 | Iwamatsu et al. ............. 399/168 |
| 2010/0215402 A1 | 8/2010 | Nagaoka |
| 2010/0278561 A1 | 11/2010 | Kanda et al. |
| 2010/0295465 A1 | 11/2010 | Hirakawa |
| 2010/0296842 A1 | 11/2010 | Imura et al. |
| 2010/0296843 A1 | 11/2010 | Hirawaka et al. |
| 2010/0296844 A1 | 11/2010 | Imura |
| 2010/0296845 A1 | 11/2010 | Hirakawa |
| 2010/0307724 A1 | 12/2010 | Ichii et al. |
| 2010/0327730 A1 | 12/2010 | Hirakawa |

FOREIGN PATENT DOCUMENTS

| | | |
|---|---|---|
| CN | 1849673 A | 10/2006 |
| EP | 1 617 449 | 1/2006 |
| EP | 1 617 450 A2 | 1/2006 |
| EP | 1 635 369 | 3/2006 |
| JP | 60-20027 A | 2/1985 |
| JP | 62-172631 | 7/1987 |
| JP | 1-107440 A | 4/1989 |
| JP | 1-149335 A | 6/1989 |
| JP | 1-279557 | 11/1989 |
| JP | 1-298623 | 12/1989 |
| JP | 6-255168 A | 9/1994 |
| JP | 8-97582 A | 4/1996 |
| JP | 8-250766 A | 9/1996 |
| JP | 9-007499 A | 1/1997 |
| JP | 9-252068 A | 9/1997 |
| JP | 10-121042 | 5/1998 |
| JP | 10-308164 A | 11/1998 |
| JP | 10-308165 | 11/1998 |
| JP | 10-308166 A | 11/1998 |
| JP | 11-251069 A | 9/1999 |
| JP | 2000-76986 A | 3/2000 |
| JP | 2000-311640 | 11/2000 |
| JP | 2001-68012 A | 3/2001 |
| JP | 2001-195973 A | 7/2001 |
| JP | 2001-357961 | 12/2001 |
| JP | 2002-93310 A | 3/2002 |
| JP | 2002-208346 A | 7/2002 |
| JP | 2002-279892 A | 9/2002 |
| JP | 2003-115385 | 4/2003 |
| JP | 2003-173744 A | 6/2003 |
| JP | 2003-173878 A | 6/2003 |
| JP | 2003-331712 | 11/2003 |
| JP | 2004-241161 | 8/2004 |
| JP | 2004-253201 A | 9/2004 |
| JP | 2004-296781 | 10/2004 |
| JP | 2004-296950 | 10/2004 |
| JP | 2004-327084 A | 11/2004 |
| JP | 2005-5205 A | 1/2005 |
| JP | 2005-190878 A | 7/2005 |
| JP | 2005-209396 A | 8/2005 |
| JP | 2005-268025 A | 9/2005 |
| JP | 2005-326080 A | 11/2005 |
| JP | 2005-328041 A | 11/2005 |
| JP | 2006-054162 | 2/2006 |
| JP | 2006-100758 A | 4/2006 |
| JP | 2006-190545 A | 7/2006 |
| JP | 2006-236964 | 9/2006 |
| JP | 2006-351524 A | 12/2006 |
| JP | 2007-290873 | 11/2007 |
| JP | 2009-019084 A | 1/2009 |
| JP | 2009-092902 A | 4/2009 |
| JP | 2009-146891 A | 7/2009 |
| JP | 4314307 B1 | 8/2009 |
| JP | 2010-267492 A | 11/2010 |
| TW | 1237722 | 8/2005 |
| TW | 1257117 | 6/2006 |
| TW | 200638455 | 11/2006 |
| TW | 1278696 | 4/2007 |
| WO | 98/27568 | 6/1998 |
| WO | 2005/004545 A1 | 1/2005 |
| WO | WO 2009/066723 | 5/2009 |

OTHER PUBLICATIONS

U.S. Appl. No. 12/940,546, filed Nov. 5, 2010, entitled "Heat Exchanger".

ISR for PCT/JP2008/071102, mailed Feb. 24, 2009 (081423/PCT).

Naoi et al, "TiO2 Films Loaded with Silver Nanoparticles: Control of Multicolor Photochromic Behavior" J. Am. Chem. Soc., vol. 126, No. 11, p. 3664-3668 (2004).

Yamaguchi and three others, "Development of Highly Efficient Electron-Beam Source by Use of Carbon Nanotube for Image Recording", Collected Papers of Japan Hardcopy 97, The Imaging Society of Japan, p. 221-224, Jul., 1997 (with partial English translation).

Notice of Allowance mailed Nov. 29, 2011 in U.S. Appl. No. 12/782,102.

ISR for PCT/JP2009/052904, mailed Apr. 21, 2009 (081677/PCT).

Electrophotography-Bases and Applications (1998; p. 213), The Society of Electrophotography of Japan, Corona Publishing Co., Ltd. (with partial English translation).

Ionic winds for locally enhanced cooling, David B. Go, Suresh V. Garimella, and Timothy S. Fisher, J. Appl. Phys., 102, 053302 (2007).

Notice of Allowance mailed Dec. 29, 2011 in U.S. Appl. No. 12/782,102.

Office Action mailed Nov. 29, 2011 in U.S. Appl. No. 12/698,435.

Office Action mailed Dec. 16, 2011 in U.S. Appl. No. 12/698,435.

U.S. Appl. No. 12/695,381, filed Jan. 28, 2010, entitled "Electron Emitting Element, Electron Emitting Device, Light Emitting Device, Image Display Device, Air Blowing Device, Cooling Device, Charging Device, Image Forming Apparatus, Electron-Beam Curing Device, and Method for Producing Electron Emitting Element".

U.S. Appl. No. 12/696,905, filed Jan. 29, 2010, entitled Electron Emitting Element, Electron Emitting Device, Light Emitting Device, Image Display Device, Air Blowing Device, Cooling Device, Charging Device, Image Forming Apparatus, Electron-Beam Curing Device, and Method for Producing Electron Emitting Element.

U.S. Appl. No. 12/698,342, filed Feb. 2, 2010, entitled Electron Emitting Element, Electron Emitting Device, Light Emitting Device, Air Blowing Device, Charging Device, Electron-Beam Curing Device, and Method for Producing Electron Emitting Element.

U.S. Appl. No. 12/698,435, filed Feb. 2, 2010, entitled Electron Emitting Element and Method for Producing Electron Emitting Element.

U.S. Appl. No. 12/699,349, filed Feb. 3, 2010, entitled "Electron Emitting Element, Electron Emitting Device, Light Emitting Device, Image Display Device, Cooling Device, and Charging Device".

U.S. Appl. No. 12/781,997, filed May 18, 2010, entitled "Electron Emitting Element, Electron Emitting Device, Charging Device, Image Forming Apparatus, Electron-Beam Curing Device, Light Emitting Device, Image Display Device, Air Blowing Device, and Cooling Device" (not yet published).

U.S. Appl. No. 12/782,024, filed May 18, 2010, entitled "Light Emitting Element, Light Emitting Device, Image Display Device, Method of Driving Light Emitting Element, and Method of Producing Light Emitting Element".

U.S. Appl. No. 12/782,102, filed May 18, 2010, entitled "Electron Emitting Element, Electron Emitting Device, Light Emitting Device, Image Display Device, Air Blowing Device, Cooling Device, Charging Device, Image Forming Apparatus, and Electron-Beam Curing Device".

Naoi et al., "TiO2 Films Loaded with Silver Nanoparticles: Control of Multicolor Photochromic Behavior", J. Am. Chem. Soc., vol. 126, No. 11, pp. 3664-3668, (2004).

Yamaguchi et al, "Development of Highly Efficient Electron-Beam Source by Use of Carbon Nanotube for Image Recording", Collected Papers of Japan Hardcopy 97, The Imaging Society of Japan, Jul. 1997, pp. 221-224.

English translation of the International Search Report mailed Feb. 24, 2009 in corresponding PCT application PCT/JP2008/071102.

U.S. Office Action mailed Jun. 18, 2012 in U.S. Appl. No. 12/698,435.

Office Action mailed Jul. 19, 2012 in U.S. Appl. No. 12/698,342.

Office Action dated Sep. 7, 2012 in U.S. Appl. No. 12/695,381.

Office Action mailed Apr. 16, 2012 in U.S. Appl. No. 12/699,349.

Notice of Allowance mailed Apr. 17, 2012 in U.S. Appl. No. 12/781,997.

Office Action mailed May 17, 2012 in U.S. Appl. No. 12/698,435.

Office Action dated Sep. 28, 2012 U.S. Appl. No. 12/659,905.

Office Action dated Nov. 27, 2012 in U.S. Appl. No. 12/698,342.

\* cited by examiner

ELECTRON EMITTING ELEMENT FOR ACCELERATING AND EMITTING ELECTRONS, AND USE OF ELECTRON EMITTING ELEMENT

This application is the U.S. national phase of International Application No. PCT/JP2008/071102, filed 20 Nov. 2008, which designated the U.S. and claims priority to Japanese Patent Application No(s). 2007-300544, filed 20 Nov. 2007 and 2008-295722, filed 19 Nov. 2008, the entire contents of each of which are hereby incorporated by reference.

TECHNICAL FIELD

The present invention relates to an electron emitting element for emitting electrons by application of a voltage.

BACKGROUND ART

A Spindt-type electrode and a carbon nanotube electrode (CNT) have been known as conventional electron emitting elements. Applications of such conventional electron emitting elements to, for example, the field of Field Emission Display (FED) have been studied. Such electron emitting elements are caused to emit electrons by tunnel effect resulting from formation of an intense electric field of approximately 1 GV/m that is produced by application of a voltage to a pointed section.

Conventionally, it has been desired that an electron emitting element works in the atmosphere, and there has been an idea of, for example, applying such an electron emitting element to a charging device or an electrostatic latent image forming device. As for an example of an electron emitting element using the Spindt-type electrode, an electron emitting element for forming an electrostatic latent image has been proposed (e.g. refer to Patent Literature 1). This electron emitting element is operated in the atmosphere so as to emit electrons into the atmosphere. This generates, by ionizing gas molecules, ions serving as electrically charged particles so that an electrostatic latent image is formed. Meanwhile, there a report has been made on a result of research in which an electron emitting element using the carbon nanotube electrode is operated in the atmosphere (e.g. refer to Non Patent Literature 1).

However, each of these two types of the electron emitting elements has an intense electric field in the vicinity of a surface of an electron emitting section. Accordingly, electrons emitted obtain a large amount of energy due to the electric field. This makes it easy to ionize gas molecules. However, cations generated in the ionization of the gas molecules are accelerated in a direction of a surface of the element due to the intense electric field and collide with the surface. This causes a problem of breakdown of the element due to sputtering. Further, ozone is generated before ions are generated, because oxygen in the atmosphere has dissociation energy that is lower than ionization energy. Ozone is harmful to human bodies, and oxidizes various substances because of its strong oxidizing power. This causes a problem in that members around the element are damaged. In order to prevent this problem, the members used around the electron emitting element are limited to members that have high resistance to ozone.

Meanwhile, an MIM (Metal Insulator Metal) type and an MIS (Metal Insulator Semiconductor) type have been known as other types of electron emitting elements. These electron emitting elements are surface-emission-type electron emitting elements which accelerate electrons by utilizing quantum size effect and an intense electric field in the element so that electrons are emitted from a flat surface of the element. These electron emitting elements do not require an intense electric field outside the elements, because the electrons which are accelerated inside the elements are emitted to the outside. Therefore, each of the MIM type and the MIS type electron emitting elements can overcome the problems such that (i) the element is broken down by the sputtering which occurs due to ionization of gas molecules and (ii) ozone is generated, in the Spindt-type, CNT type, and BN type electron emitting elements.

As an example of the MIS type electron emitting element that utilizes quantum size effect of a porous semiconductor (e.g. porous silicon) which is formed by anodizing a semiconductor, another electron emitting element is proposed (e.g. refer to Patent Literature 2). The another electron emitting element (i) accelerates electrons injected into the porous semiconductor by use of an electric field and (ii) causes the electrons to pass through a surface thin metal film by tunnel effect so that the electrons are emitted in vacuum. Further, the above electron emitting element by use of the porous semiconductor has a great advantage in that the element can be produced by an anodic oxidation which is a very easy and inexpensive production method.

In addition, there has been known a still another electron emitting element in which a layer of semiconductor particles or fine metal particles whose surfaces are covered with insulating layers is repeatedly formed (e.g. refer to Patent Literature 3).

Citation List

Patent Literature 1
Japanese Patent Application Publication, Tokukaihei, No. 6-255168 (Publication Date: Sep. 13, 1994)
Patent Literature 2
Japanese Patent Application Publication, Tokukaihei, No. 8-250766 (Publication Date: Sep. 27, 1996)
Patent Literature 3
Japanese Patent Application Publication, Tokukaihei, No. 9-7499 (Publication Date: Jan. 10, 1997)
Non Patent Literature 1
Yamaguchi and three others, "Development of Highly Efficient Electron-Beam Source by Use of Carbon Nanotube for Image Recording", Collected Papers of Japan Hardcopy 97, The Imaging Society of Japan, p. 221-224, July, 1997

SUMMARY OF INVENTION

However, in cases where each of the above conventional electron emitting elements of the MIM type and the MIS type is operated in the atmosphere, various gas molecules adhere to a surface of the element. This changes an electric property of a semiconductor and reduces an electron emission current, which is a new problem. In particular, deterioration of the semiconductor due to oxidation caused by oxygen in the atmosphere is inevitable, which is a serious problem.

In each of the conventional electron emitting elements of the MIM type and the MIS type in which electrons are accelerated inside the element, a surface of the element serves as an upper electrode for applying an electric field inside the element. This surface is generally made of a thin metal film. Further, the surface of each of the conventional electron emitting elements of the MIM type and the MIS type also has a function to emit electrons accelerated inside the element in vacuum by allowing the electrons to tunnel the thin metal film. The thinner the thin metal film is, the greater the possibility of tunneling of the electrons accelerated inside the element becomes and the greater the amount of electrons emitted becomes. Accordingly, a thinner metal film is preferable. However, if the thin metal film is too thin, a barrier effect against gas molecules is barely provided because it becomes difficult to form a dense film. Therefore, when such an electron emitting element is operated in the atmosphere, gas molecules come into a semiconductor layer and changes an electric property of the semiconductor. This causes a problem such that electron emission current decreases.

As a result, regarding the electron emitting element in which a layer of semiconductor fine particles or metal fine particles as cores whose surfaces are covered by insulating layers is repeatedly formed, the electron emitting element cannot steadily generate electrons in the atmosphere. In particular, when the insulating layer is made of an oxide film of each of the semiconductor fine particles or the fine metal particles, oxidization of the fine particles proceeds due to oxygen in the atmosphere. This increases a thickness of the oxide film. The increase in thickness of the oxide film lowers the possibility of tunneling of the electrons and ultimately stops electron emission.

Meanwhile, an insulating film having a film thickness that allows tunneling of electrons has a very low resistance value. Accordingly, too much current flow inside the element causes dielectric breakdown or heat generation. This damages the fine particles or the insulating layer. As a result, the element is broken down.

The present invention is made in view of the foregoing problems. An object of the present invention is to provide an electron emitting element which is capable of (i) steadily emitting electrons not only in vacuum but also in the atmosphere and (ii) preventing harmful substances such as ozone and NOx from being produced in conjunction with emission of electrons.

In order to solve the problems described above, an electron emitting element including an electrode substrate and a thin-film electrode, the electron emitting element (i) accelerating electrons between the electrode substrate and the thin-film electrode by voltage application between the electrode substrate and the thin-film electrode and (ii) emitting the electrons from the thin-film electrode, the electron emitting element includes: an electron acceleration layer provided between the electrode substrate and the thin-film electrode, the electron acceleration layer including: electrically conductive fine particles having high resistance to oxidation, the electrically conductive fine particles being made of a conductor; and an insulating material which is larger in size than the electrically conductive fine particles.

According to the arrangement, between the electrode substrate and the thin-film electrode, there is the electron acceleration layer including (i) the electrically conductive fine particles that have a high resistance to oxidation and that are made of a conductor, and (ii) the insulating material which is larger than the electrically conductive fine particles. In this application, to have a high resistance to oxidation means to have a small oxide formation reaction. In general, according to a thermodynamic calculation, when a value of a change ΔG [kJ/mol] in free energy of oxide formation is negative and greater, the oxide formation reaction occurs more easily. In the present invention, a metal element whose ΔG is equal to or greater than −450 [kJ/mol] is considered to be the electrically conductive fine particles having a high resistance to oxidation. Further, the electrically conductive fine particles having a high resistance to oxidation also include electrically conductive fine particles in which an oxide formation reaction is made difficult to occur by attaching an insulating material smaller than the electrically conductive fine particles to the electrically conductive fine particles or by coating the electrically conductive fine particles with use of such an insulating material.

The electron acceleration layer is a thin film layer in which the insulating material and the electrically conductive fine particles having a high resistance to oxidation are densely provided. This electron acceleration layer has a semiconductive property. When a voltage is applied to this semiconductive electron acceleration layer, current flows inside the electron acceleration layer. Then, a part of electrons in the current become ballistic electrons due to an intense electric field formed by the applied voltage, and the ballistic electrons are emitted.

Further, in the electron emitting element, because the conductor having a high resistance to oxidation is used as the electrically conductive fine particles, element degradation is difficult to occur due to oxidization caused by oxygen in the atmosphere. This allows the electron emitting element to steadily work in the atmosphere.

Further, the insulating material and the electrically conductive fine particles can control an amount of ballistic electrons produced and a resistance value in the electron acceleration layer. This allows controlling a current value in the electron acceleration layer and an amount of electrons emitted. Moreover, the insulating material can also serve to effectively dissipate Joule heat generated by current flowing in the electron acceleration layer. This prevents the electron emitting element from being damaged by heat.

Because the electron emitting element of the present invention has the above arrangement, the electron emitting element of the present invention can operate not only in vacuum but also in the atmosphere without electric discharge. Accordingly, the electron emitting element produces substantially no harmful substances such as ozone and NOx. As a result, the electron emitting element does not deteriorate due to oxidation degradation. Therefore, the electron emitting element of the present invention has a long life and can be continuously operated for a long period of time even in the atmosphere. Thus, the present invention makes it possible to provide an electron emitting element which can steadily operate not only in vacuum but also in the atmosphere while suppressing generation of harmful substances such as ozone, NOx, and the like.

For a fuller understanding of the nature and advantages of the invention, reference should be made to the ensuing detailed description taken in conjunction with the accompanying drawings.

| Reference Signs List | |
|---|---|
| 1, 1' | Electron emitting element |
| 2 | Substrate (electrode substrate) |
| 3 | Upper electrode (thin-film electrode) |
| 4 | Fine particle layer (electron acceleration layer) |
| 4' | Electron acceleration layer |
| 5 | Insulating fine particle (insulating material) |
| 5' | Insulating material |
| 6 | Metal fine particle (electrically conductive fine particle) |
| 7 | Power supply (power supply section) |
| 8 | Counter electrode |
| 9 | Insulating spacer |
| 11 | Photoreceptor |
| 21 | Acceleration electrode |
| 22 | Resist |
| 31, 31', 31" | Light emitting device |
| 32, 32' | Luminous body |
| 33 | ITO film |
| 34 | Glass substrate |
| 35 | Power supply |
| 36 | Light-emitting section |
| 41 | Object to be cooled |
| 42 | Blowing fan |
| 51 | Hole |
| 90 | Charging device |
| 100 | Electron-beam curing device |
| 140 | Image display device |
| 150 | Air blowing device |
| 160 | Air blowing device |
| 330 | Liquid crystal panel |

DESCRIPTION OF EMBODIMENTS

The following explanation deals with an embodiment of an electron emitting element of the present invention with reference to FIG. 1 through FIG. 17. Note that the following embodiments and examples are merely concrete examples of the present invention and the present invention is not limited to the following embodiments and examples.

Embodiment 1

Figure 1:
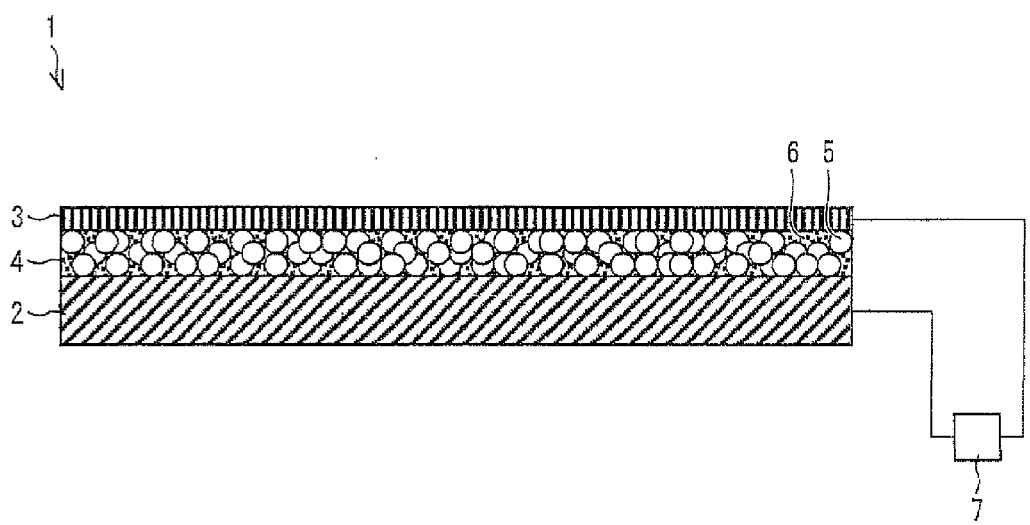
FIG. 1 is a schematic view illustrating a configuration of an electron emitting element according to an embodiment of the present invention.

FIG. 1 is a schematic view illustrating an embodiment of an electron emitting element of the present invention. As illustrated in FIG. 1, an electron emitting element 1 of the present embodiment includes a substrate (electrode substrate) 2 serving as a lower electrode, an upper electrode (thin-film electrode) 3, and an electron acceleration layer 4 sandwiched between the substrate 2 and the upper electrode 3. Further, the substrate 2 and the upper electrode 3 are connected to a power supply 7, so that a voltage can be applied between the substrate 2 and the upper electrode 3 which are provided so as to face each other. The electron emitting element 1 applies a voltage between the substrate 2 and the upper electrode 3 so that current flows between the substrate 2 and the upper electrode 3, that is, in the electron acceleration layer 4. A part of electrons in the current are caused to transmit through the upper electrode 3 or be emitted through gaps in the upper electrode 3 as ballistic electrons due to an intense electric field formed by the applied voltage. The electron emitting element 1 and the power supply 7 constitute an electron emitting device.

The substrate 2 serving as the lower electrode also acts as a supporting member of the electron emitting element. Accordingly, the substrate 2 is not specifically limited in material as long as the material has a sufficient strength, excellent adhesiveness with respect to a substance in direct contact with the material and sufficient electrical conductivity. Examples of the substrate include: metal substrates made of, for example, SUS, Ti, and Cu; semiconductor substrates made of, for example, Si, Ge, and GaAs; insulator substrates such as a glass substrate; and plastic substrates. In cases where an insulator substrate such as a glass substrate is used, an electrically conductive material such as metal is attached, as an electrode, to an interface of the insulator substrate and the electron acceleration layer 4 so that the insulator substrate can be used as the substrate 2 that serves as the lower electrode. A constituent material of the electrically conductive material is not specifically limited as long as a thin film of a noble metal material excellent in electric conductivity can be formed by magnetron sputtering or the like. An ITO thin-film which is widely used as an electrically conductive oxide material for a transparent electrode is also applicable. Alternatively, it is possible to use, as the lower electrode, a metal thin film obtained by first forming a Ti film of 200 nm on a surface of a glass substrate and then forming a Cu film of 1000 nm on the Ti film, because a strong thin film can be formed. In this case, materials and values are not specifically limited to those described above.

The upper electrode 3 is for applying a voltage in the electron acceleration layer 4. Accordingly, a material of the upper electrode 3 is not specifically limited as long as the material makes it possible to apply a voltage. A material which has a low work function and from which a thin-film can be formed is expected to provide a greater effect, in view of emitting, with a minimum energy loss, electrons which have high energy due to acceleration within the electron acceleration layer 4. Examples of such a material include: gold, silver, carbon, tungsten, titanium, aluminum, and palladium each of which has a work function in a range of 4 eV to 5 eV. Among these materials, in particular, in consideration of an operation under an atmospheric pressure, the best material is gold which is free from oxide or sulfide formation reaction. Further, silver, palladium, or tungsten each of which has a relatively small oxide formation reaction is also applicable material that can be used without any problem. Further, a film thickness of the upper electrode 3 is a very important factor for causing efficient emission of electrons from the electron emitting element 1 to the outside. The upper electrode 3 preferably has a film thickness in a range of 10 nm to 55 nm. The minimum film thickness of the upper electrode 3 is 10 nm, for causing the upper electrode 3 to work properly as a planar electrode. A film thickness of less than 10 nm cannot ensure electrical conduction. On the other hand, the maximum film thickness of the upper electrode 3 is 55 nm, for emitting electrons from the electron emitting element 1 to the outside. In a case where the film thickness is more than 55 nm, ballistic electrons do not pass thorough the upper electrode 3. In such a case, the ballistic electrons are absorbed by the upper electrode 3, or the ballistic electrons are reflected back by the upper electrode 3 and recaptured in the electron acceleration layer 4.

The electron acceleration layer 4 should include (i) electrically conductive fine particles each of which is made of a conductor and has a high resistance to oxidation and (ii) an insulating material whose particle size is larger than those of the electrically conductive fine particles. In the present embodiment, an explanation is given on the assumption that the electrically conductive fine particles are metal fine particles 6. Further, in the present embodiment, the explanation is given on the assumption that the insulating material is made of insulating fine particles 5 whose average diameter is greater than that of the metal fine particles 6. However, the electron acceleration layer 4 is not limited to the above arrangement. For example, the electron acceleration layer 4 may be arranged such that a layer of the insulating material is formed on the substrate 2 so as to have a plurality of holes penetrating the layer in a thickness direction of the layer and the electrically conductive fine particles are provided in the holes.

In the present embodiment, the electron acceleration layer 4 includes the insulating fine particles 5 and the metal fine particles 6. Therefore, the electron acceleration layer 4 is called a fine particle layer 4 hereinafter.

The metal fine particles 6 can be made of any kind of metal, in view of an operation principle for generating ballistic electrons. However, for the purpose of preventing oxidation degradation at the time of an operation under the atmospheric pressure, the metal is required to have a high resistance to oxidation. Therefore, the metal fine particles 6 are preferably made of noble metal such as gold, silver, platinum, palladium, and nickel. The metal fine particles 6 can be produced by using a known fine particle production method such as a sputtering method or a spray heating method. It is also possible to use commercially available metal fine particle powder such as silver nanoparticles manufactured and marketed by Ouyou Nano Laboratory K.K. A principle of generating ballistic particles will be described later.

In the present embodiment, because control of electric conductivity is required, an average diameter of the metal fine particles 6 has to be smaller than that of the insulating fine particles 5 which are later described. The metal fine particles 6 preferably have an average diameter in a range of 3 nm to 10 nm. In a case where, as described above, the average diameter of the metal fine particles 6 is arranged to be smaller than that of the insulating fine particles 5 and preferably in a range of 3 nm to 10 nm, a conductive path made of the metal fine particles 6 is not formed in the fine particle layer 4. As a result, dielectric breakdown becomes difficult to occur in the fine particle layer 4. The principle has a lot of unexplained points; however, the ballistic electrons are efficiently generated by use of the metal fine particles 6 whose average particle diameter is within the above range.

Note that a metal fine particle 6 may be surrounded by an insulating material whose size is smaller than the metal fine particle 6. The insulating material smaller than the metal fine particle 6 can be an adhering substance which adheres to a surface of the metal fine particle 6. Further, the adhering substance may be an insulating coating film that coats the surface of the metal fine particle 6 and that is made as an aggregate of particles whose average diameter is smaller than that of the metal fine particle 6. In view of the operation principle for generating ballistic electrons, any insulating material can be used as the insulating material whose size is smaller than that of the metal fine particle 6. However, in a case where the insulating material whose size is smaller than that of the metal fine particle 6 is the insulating coating film coating the surface of the metal fine particle 6 and an oxide film of the metal fine particle 6 is used as the insulating coating film, a thickness of the oxide film may be increased to a thickness larger than a desired thickness due to oxidation degradation in the atmosphere. For the purpose of preventing the oxidation degradation at the time of an operation under the atmospheric pressure, the insulating coating film is preferably made of an organic material. Examples of the organic material include: alcoholate, aliphatic acid, and alkanethiol. A thinner insulating coating film is more advantageous.

The material of the insulating fine particles 5 may be any material having an insulating property. However, according to the experiment results explained later, it is preferable that a ratio by weight of the insulating fine particles 5 with respect to a total weight of fine particles constituting the fine particle layer 4 is in a range of 80% to 95%. Further, for achieving heat dissipation superior to that of the meal fine particles 6, the insulating fine particles 5 are preferably larger in diameter than the metal fine particles 6. Accordingly, the diameter (average diameter) of the insulating fine particles 5 preferably is in a range of 10 nm to 1000 nm, and more preferably in a range of 12 nm to 110 nm. Therefore, $SiO_2$, $Al_2O_3$, $TiO_2$, or the like is practically used as a material of the insulating fine particles 5. However, in a case where surface-treated silica particles having a small diameter are used, a surface area of the surface-treated silica particles is increased in a solvent and viscosity of the solution increases as compared to a case where spherical silica particles having a particle diameter larger than that of the surface-treated silica particles having a small diameter. As a result, the thickness of the fine particle layer 4 tends to become slightly larger. Further, fine particles made of an organic polymer can be used as the material of the insulating fine particles 5. Examples of such fine particles that can be used are cross-linked fine particles (SX 8743) made of stylene/divinylbenzene manufactured and marketed by JSR Corporation, or Fine Sphere series which are styrene acryl fine particles manufactured by NIPPON PAINT Co., Ltd. In the present embodiment, particles that may be used as the insulating fine particles 5 include (i) two or more different kinds of particles, (ii) particles having different peaks in diameter, or (iii) one kind of particles whose distribution of diameters is broad.

A function of the insulating material does not depend on shape of the insulating fine particles. Therefore, a sheet substrate made of an organic polymer or an insulating layer formed by applying an insulating material in some method may be used as the insulating material as described above. However, such a sheet substrate or insulating layer is required to have a plurality of fine holes penetrating the sheet substrate or the insulating layer in a thickness direction. As an example of such a sheet substrate material that meets the above requirement, Nuclepore membrane filter (made of polycarbonate) manufactured and marketed by Whatman Japan K.K. is useful.

The thinner the fine particle layer 4 is, the stronger the electric field becomes. Therefore, even by a low voltage application, electrons can be accelerated in the case where the fine particle layer 4 is thin. However, it is preferable that the fine particle layer 4 has a thickness in a range of 12 nm to 6000 nm, and more preferably 300 nm to 6000 nm. This is because the thickness of the fine particle layer 4 in the above range makes it possible (i) to make a layer thickness of the electron acceleration layer even and (ii) to control a resistance of the electron acceleration layer in a layer thickness direction.

Figure 2:
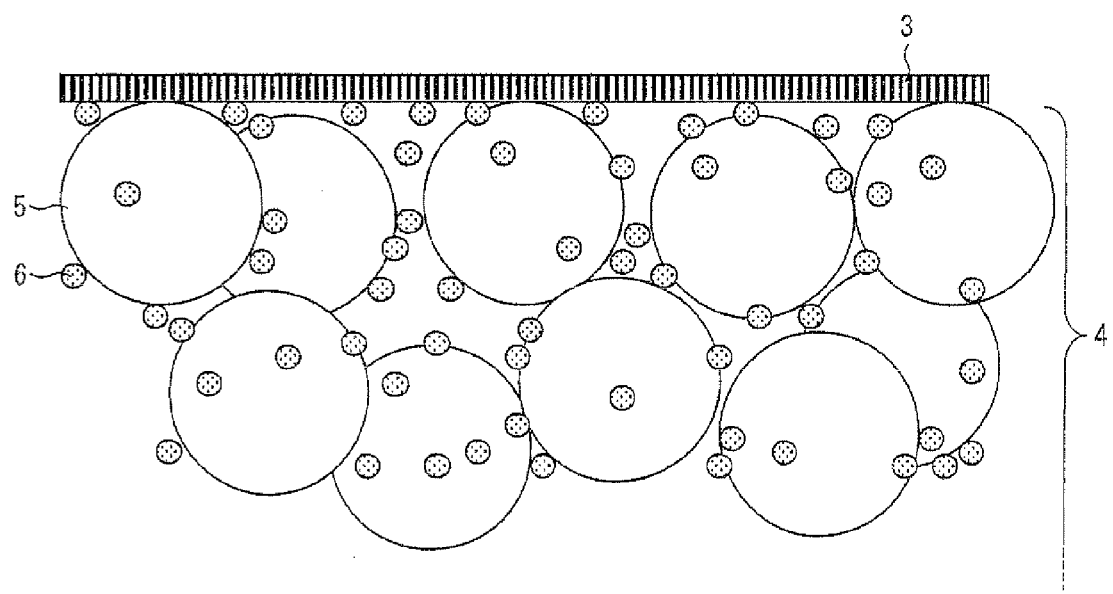
FIG. 2 is an enlarged view illustrating a cross section in the vicinity of a fine particle layer of the electron emitting element illustrated in FIG. 1.

The following explanation deals with a principle of the electron emission. FIG. 2 is a schematic view magnifying a cross section in the vicinity of the fine particle layer 4 in the electron emitting element 1. As illustrated in FIG. 2, the fine particle layer 4 is made mostly of the insulating fine particles 5, and the metal fine particles 6 are scattered in spaces between the insulating fine particles 5. As for a ratio of the insulating fine particles 5 and the metal fine particles 6 in FIG. 2, a ratio by weight of the insulating particles 5 with respect to the total weight of the insulating fine particles 5 and the metal fine particles 6 is approximately 80%, and approximately six metal fine particles 6 adhere to one insulating fine particle 5.

The fine particle layer 4 includes the insulating fine particles 5 and a small number of metal fine particles 6, thereby having a semi-conductive property. Therefore, a voltage application to the fine particle layer 4 causes very weak current flow. A volt-ampere characteristic of the fine particle layer 4 shows a so-called varistor characteristic, and a current value sharply increases as an applied voltage increases. A part of electrons in the current become ballistic electrons due to an intense electric field formed within the fine particle layer 4 by the applied voltage. The ballistic electrons are emitted to the outside of the electron emitting element 1 by transmitting though the upper electrode 3 or through gaps in the upper electrode 3. A generation process of the ballistic electrons has not been determined, but it is considered that the ballistic electrons are generated by simultaneous acceleration and tunneling of electrons in a direction of an electric field.

The following explanation deals with an embodiment of a method of forming the electron emitting element 1. Firstly, dispersion solution in which the insulating particles 5 and the metal fine particles 6 are dispersed is applied on the substrate 2 by a spin coating method so that the fine particle layer 4 is formed. In the present embodiment, as for a solvent of the dispersion solution, any kind of solvent can be used as long as the insulating fine particles 5 and the metal fine particles 6 can be dispersed in the solvent and dried after the application on the substrate 2. For example, toluene, benzene, xylene, hexane, tetradecane, or the like can be used as the solvent. For the purpose of improving dispersibility of the metal fine particles 6, an alcoholate treatment is preferably carried out as a preliminary treatment. A predetermined film thickness can be obtained by repeating, a plurality of times, (i) film formation by the spin coating method and (ii) drying. Other than the spin coating method, the fine particle layer 4 can be formed by, for example, a dropping method or a spray coating method. Then, the upper electrode 3 is formed on the electron acceleration layer 4. For forming the upper electrode 3, a magnetron sputtering method can be used, for example.

In the electron emitting element 1, in a case where the insulating material (corresponding to the insulating fine particles 5 in the fine particle layer 4) in the electron acceleration layer is obtained by forming a layer, the electron emitting element 1 can be formed as follows. Firstly, an insulating material (sheet insulating material, hereinafter) that is in a sheet form and has a plurality of holes penetrating the layer in a thickness direction of the layer is laminated on the substrate 2. Alternatively, a coating solution in which the insulating material is dissolved/dispersed is applied on the substrate 2 so that the insulating layer is formed. For example, a sheet substrate made of an organic polymer, $SiO_2$, or $Al_2O_3$ can be used as the sheet insulating material. Alternatively, $SiO_2$, $Al_2O_3$ and $TiO_2$, or an organic polymer can be used as a material for forming the insulating layer.

In a case where the insulating layer is made of an organic polymer, the plurality of holes can be formed by a punching method using a blade or by a laser-beam drilling method using high-energy laser-beam irradiation. In a case where the insulating layer is made of $SiO_2$, or $Al_2O_3$, desired holes can be formed by an anodic oxidation method. Particularly, for forming an $SiO_2$ nanoporus structure, desired holes can be formed by a hydrothermal reaction method by use of a surface active agent as a mold. A diameter of each of the holes is required to be larger than a diameter of the metal fine particles to be used, and preferably in a range of 50 nm to 50 nm. The sheet insulating material including such holes is laminated on the substrate 2. Alternatively, a coating solution in which an insulating material is dissolved or dispersed is applied on the substrate 2 so as to form an insulating layer, and then the plurality of holes are formed in the insulating layer formed as described above.

In the above explanation, the sheet insulating material including the holes is laminated on the substrate 2. However, the holes can be formed after the layer is formed by laminating the sheet insulating material on the substrate 2.

Subsequently, the metal fine particles 6 each covered by an insulating coating film are filled in the holes of the sheet insulating material. Here, for example, the holes are permeated with the solution in which the metal fine particles 6 each coated by an insulating coating film are dispersed, and then, the solution is dried naturally so that the electron acceleration layer 4 is formed. The holes may also be permeated directly with the metal fine particles 6 that are not dispersed in a solvent by, for example, blowing, suctioning, or rubbing in the metal fine particles 6. On the electron acceleration layer 4 formed as described above, a film of the upper electrode 3 is formed. For example, a magnetron sputtering method can be used for the film formation of the upper electrode 3.

EXAMPLE 1

The following explanation deals with an example of an electron emission experiment by use of the electron emitting element of the present invention, with reference to FIG. 3 through FIG. 7. This experiment is merely an example of the present embodiment and by no means limits the present invention.

In the present example, five different kinds of electron emitting elements 1 were produced so that each electron emitting element 1 had a different composition of the insulating fine particles 5 and the metal fine particles 6 whose surfaces an insulating material (adhering substance) was attached to in the fine particle layer 4.

A 30 mm square SUS substrate was used as the substrate 2. On this substrate 2, the fine particle layer 4 was formed by the spin coating method. A solution used in the spin coating method was a solution which included the insulating fine particles 5 and the metal fine particles 6 whose surfaces an insulating material was attached to. The solution was obtained by dispersing the particles 5 and 6 in toluene as a solvent. Regarding the insulating fine particles 5 and the metal fine particles 6 which were dispersed in the toluene solvent, composition ratios of the insulating fine particles 5 and the metal fine particles 6 whose surfaces an insulating material was attached to were such that ratios by weight of the insulating fine particles 5 with respect to the total amount of the insulating fine particles 5 and the metal fine particles 6 were configured to be 70%, 80%, 90%, and 95%, respectively.

Silver nanoparticles (average diameter of 10 nm, inclusive of a thickness of 1nm of alcoholate insulating coating film) were used as the metal fine particles 6 whose surfaces an insulating material was attached to, and spherical silica particles (average particle diameter of 110 nm) were used as the insulating fine particles 5.

The solution in which the fine particles were dispersed was prepared in the following procedure. First, 3 mL of toluene solvent was poured into a 10 mL reagent bottle, and then 0.5 g of silica particles were added. The reagent bottle was set in an ultrasonic dispersion device so that the silica particles were dispersed. Thereafter, 0.055 g of silver nanoparticles were added and the ultrasonic dispersion was performed in the same manner as previous dispersion. As a result, dispersion solution containing the insulating fine particles (silica particles) at a composition ratio of 90% was obtained.

A condition for film formation by the spin coating method was such that: after the dispersion solution was dropped on a substrate, the substrate was spun at 500 RPM for five seconds and then at 3000 RPM for ten seconds. Film formation under this condition was repeated three times so that three layers were formed on the substrate. Then, the substrate including the three layers was dried naturally at a room temperature. As a result, a thickness of thus obtained film was approximately 1500 nm.

After forming the fine particle layer 4 on a surface of the substrate 2, the upper electrode 3 was formed by using a magnetron sputtering device. Gold was used as a material for forming a film. A thickness of the upper electrode 3 was 12 nm and an area thereof was 0.28 cm$^2$.

Figure 3:
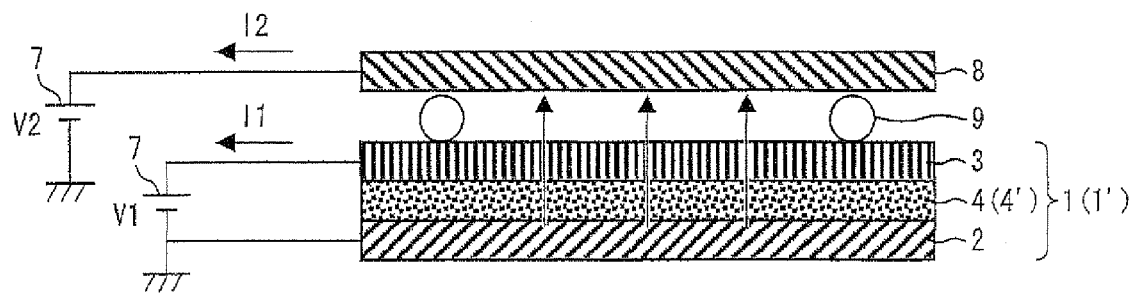
FIG. 3 is a diagram illustrating a measurement system for an electron emission experiment.

By use of a measurement system as illustrated in FIG. 3, an electron emission experiment was conducted with the electron emitting element produced as describe above. In the experiment system in FIG. 3, a counter electrode 8 was provided on a side of the upper electrode 3 of the electron emitting element 1 so that the counter electrode 8 and the upper electrode 3 sandwiched an insulating spacer 9. Each of the electron emitting element 1 and the counter electrode 8 was connected to a power supply 7 so that a voltage V1 was applied to the electron emitting element 1 and a voltage V2 was applied to the counter electrode 8. The above experiment system was set up in vacuum at 1×10$^{-8}$ ATM and an electron emission experiment was carried out. Further, the same experimental system was set up in the atmosphere and an electron emission experiment was carried out. These experimental results are shown in FIG. 4 through FIG. 7.

Figure 4:
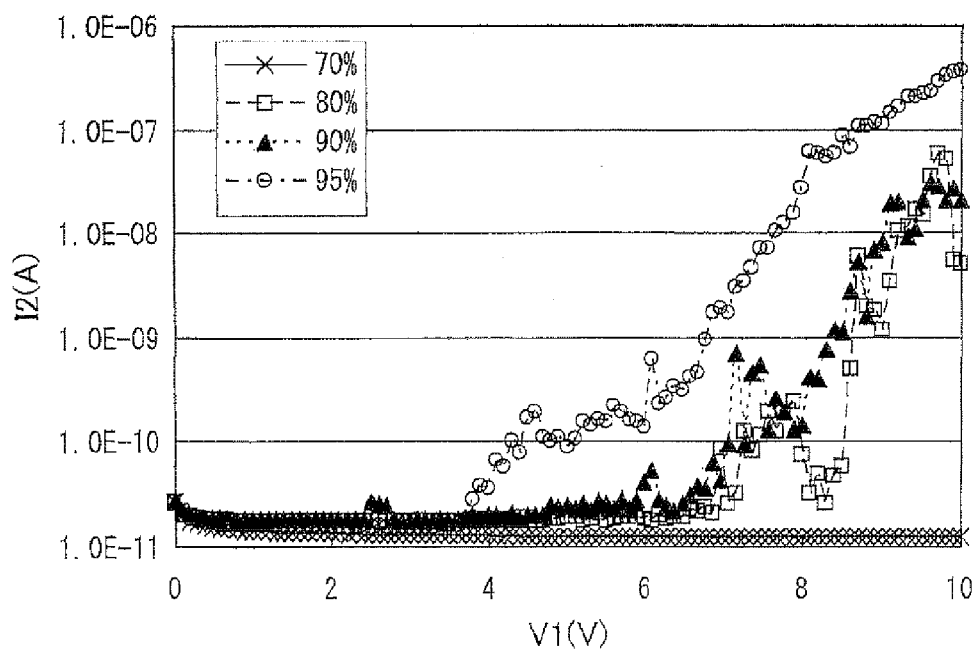
FIG. 4 is a graph showing electron emission current in vacuum.

FIG. 4 is a graph showing a result of measuring electron emission current in the electron emission experiment in vacuum. In this graph, V1 is in a range of 1 V to 10 V, and V2 is equal to 50 V. As shown in FIG. 4, in vacuum at 1×10$^{-8}$ ATM, no electron emission was observed when the ratio by weight of silica particles was 70%. Meanwhile, when the ratios by weight of the silica particles were at 80%, 90%, and 95%, current caused by the electron emission was observed. A value of the current was approximately 10$^{-7}$ A when a voltage of 10 V was applied.

Figure 5:
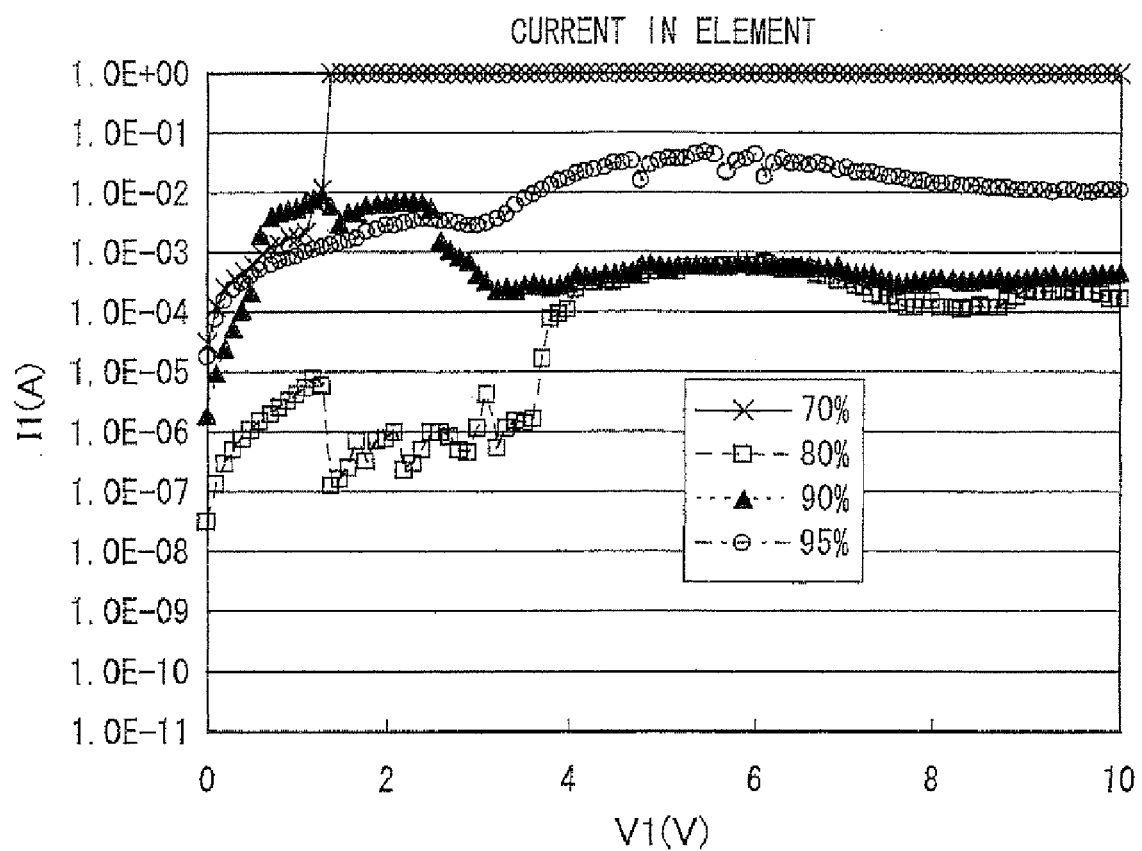
FIG. 5 is a graph showing current in an element at the time of electron emission in vacuum.

Similarly, FIG. 5 is a graph showing a result of measuring current in the element in the electron emission experiment in vacuum. As in the graph shown in FIG. 4, in this graph, V1 was set in a range of 1 V to 10 V, and V2 was set to be equal to 50 V. FIG. 5 shows that dielectric breakdown occurred due to an insufficient resistance value (an over-range current value occurred and, in the graph, the current value stays at the upper limit of the graph) in a case where the ratio by weight of silica particles was 70%. As the composition ratio of the metal fine particles increases, a conductive path made of the metal fine particles tends to be formed and this results in a large current flow in the fine particle layer 4 at a low voltage. It is considered that, as a result of the formation of the conductive path, a condition for ballistic electron generation is not satisfied.

Figure 6:
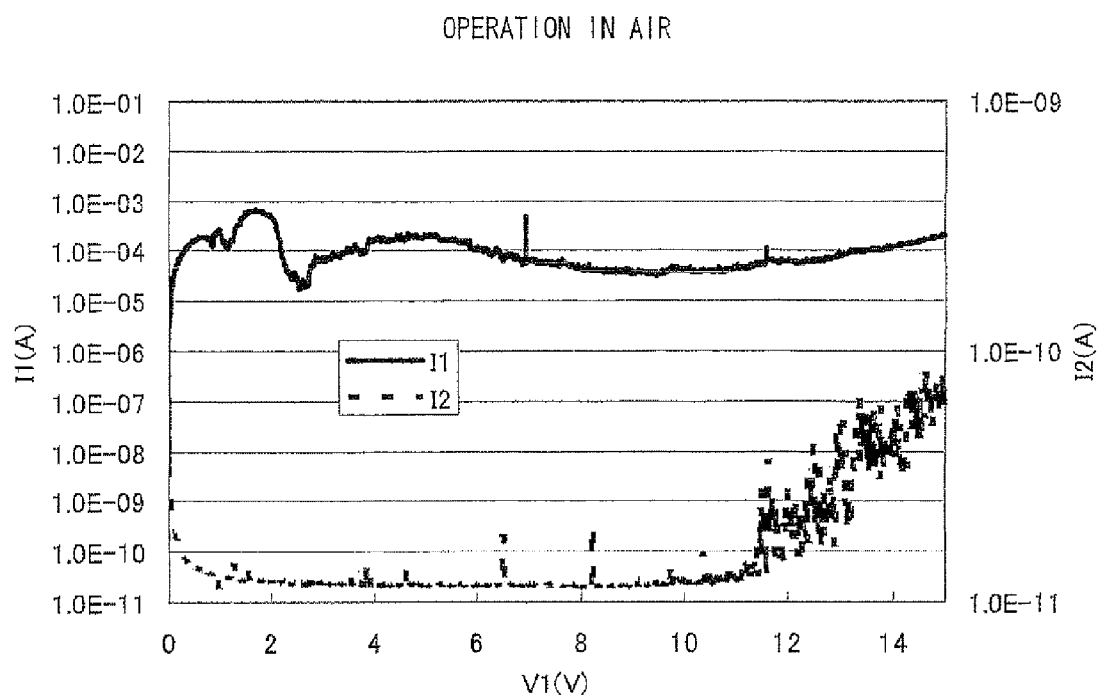
FIG. 6 is a graph showing electron emission current and current in an element at the time of electron emission in the atmosphere.

FIG. 6 is a graph showing results of measuring electron emission current and current in the element in the electron emission experiment in the atmosphere. In this electron emission experiment in the atmosphere, an electron emitting element whose composition ratio of silica particles was 90%, and V1 was set in a range of 1 V to 15 V and V2 was set to 200 V.

As shown in FIG. 6, a current of approximately 10$^{-10}$ A was observed in the atmosphere at application of a voltage V1 equal to 15 V.

Figure 7:
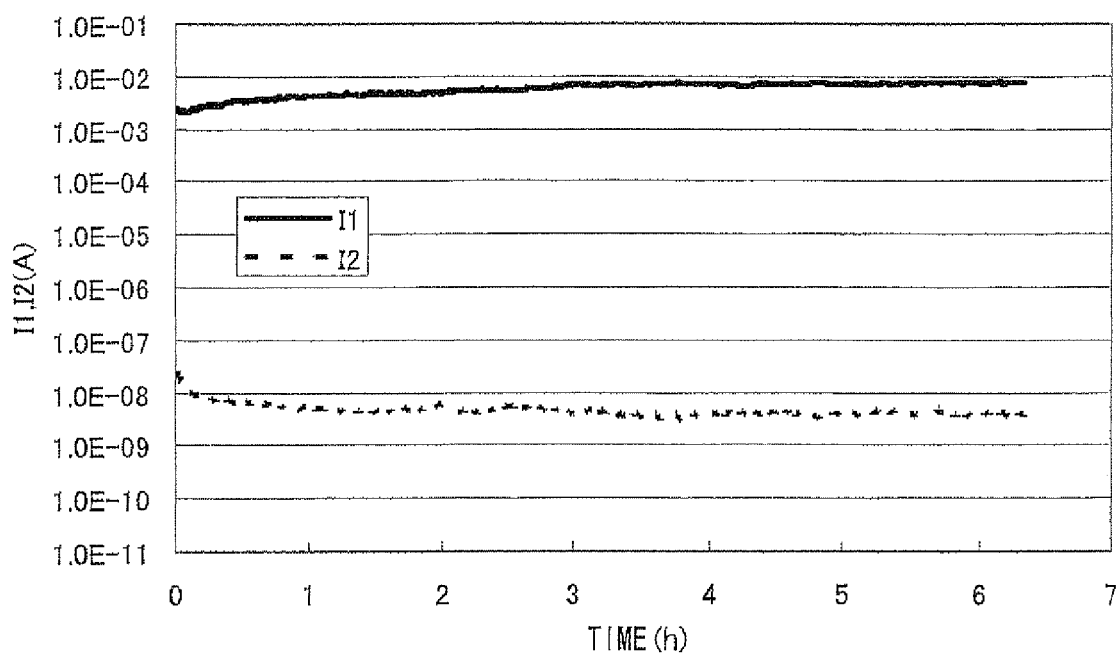
FIG. 7 is a graph showing respective changes of electron emission current and current in an element over time in the atmosphere.

Further, FIG. 7 is a graph showing a result of measuring electron emission current and current in the element in the electron emission experiment in the atmosphere. In this electron emission experiment in the atmosphere, the electron emitting element whose composition ratio of silica particles was 90% was used in the same manner as the experiment shown in FIG. 6, while the electron emitting element was continuously operated by applying V1 equal to 15 V and V2 equal to 200 V. As shown in FIG. 7, the electron emitting element kept steadily emitting electrons for over 6 hours.

EXAMPLE 2

In the present example, four kinds of electron emitting elements 1 were produced so that, while compositions of the insulating fine particles 5 and the metal fine particles 6 whose surfaces an insulating material was attached to were the same as those in Example 1, a layer thickness of the fine particle layer 4 was changed by changing condition for film formation of the fine particle layer 4.

Regarding the insulating fine particles 5 and the metal fine particles 6 which were dispersed in a dispersion solution to be used in spin coating, a composition ratio of the insulating fine particles 5 and the metal fine particles 6 whose surfaces an insulating material was attached to was adjusted such that a ratio by weight of the insulating fine particles 5 with respect to the total amount of the insulating fine particles 5 and the metal fine particles 6 was 80%. Film formation under the above described condition for film formation was carried out once or five times according to the spin coating method so as to produce the electron emitting elements 1. Further, under the same condition for film formation by the spin coating method, film formation was carried out once by spin coating by supplying a reduced amount of coating solution to a surface to be coated. In addition, film formation of the fine particle layer 4 was carried out by a method, different from the above film-formation method, according to which the dispersion solution was simply dropped on a surface of the substrate 2. Table 1 shows relations between each condition for film formation and a thickness of the fine particle layer 4.

TABLE 1

| Conditions for Film Formation | Thickness of Fine Particle Layer 4 |
|---|---|
| One-time Spin-coating with Reduced Coating Solution | 300 nm |
| One-time Spin-coating | 780 nm |
| Five-time Spin-coating | 3000 nm |
| One-time Drop | 6000 nm |
| Two-time Drop | 19000 nm |

The electron emitting elements 1 produced in the present example were measured in the measurement system illustrated in FIG. 3. A result of the measurement is described below. The measurement was carried out at V1 in a range of 1 V to 20 V and V2 equal to 50 V. As a result of the measurement, in vacuum at $1 \times 10^{-8}$ ATM, electrons were emitted by the electron emitting elements whose fine particle layers 4 had respective thicknesses in a range of 300 nm to 6000 nm. However, electrons were not emitted by the electron emitting element whose fine particle layer 4 had a thickness of 19000 nm because current flow in the element was insufficient due to a high resistance of the element.

EXAMPLE 3

The above Examples 1 and 2 employed a system in which (i) spherical silica particles serving as the insulating fine particles 5 and (ii) silver nanoparticles with alcoholate coating film, serving as the metal fine particles 6 whose surfaces an insulating material was attached to, were dispersed in the toluene solvent. In the present example, an electron emitting elements were formed by using gold, platinum, and paradigm as the metal fine particles.

For formation of the fine particle layer 4, the spin coating method was used, and a solution in which the particles were dispersed was prepared in the following procedure. First, 3 mL of ethanol solvent was poured into a 10 mL reagent bottle, and then 0.5 g of spherical silica particles (average particle diameter of 110 nm) were added. The reagent bottle was set in an ultrasonic dispersion device so that the silica particles were dispersed. Thereafter, 0.055 g of gold fine particles (average particle diameter of 3 nm) were added and the ultrasonic dispersion was further performed in the same manner as the dispersion of the silica particles. The dispersion solution prepared under this condition has a composition ratio of the silica particles with respect to the total amount of fine particles in the dispersion solution at 90%.

The condition for film formation by the spin coating method was the same as the above examples. However, it was necessary to perform, as a preliminary treatment, a hydrophilic treatment on a surface of the SUS substrate by use of silane coupling agent. On the surface of the fine particle layer 4 prepared as described above, a film of the upper electrode 3 was formed by use of a magnetron sputtering device. Gold was used as a material for the film formation of the upper electrode 3. A thickness of the upper electrode 3 was set to 12 nm and an area of the upper electrode 3 was set to 0.28 cm².

In the electron emitting element formed as described above, in vacuum at $1 \times 10^{-8}$ ATM, electron emission current of $6 \times 10^{-8}$ A was observed when a voltage of 10 V was applied to the upper electrode.

Similarly, the electron emitting elements were formed by using platinum fine particles and palladium fine particles, respectively. These electron emitting elements were also determined to be capable of emitting electrons.

EXAMPLE 4

In the present example, an electron emitting element was produced by use of fine particles made of an organic polymer as the insulating fine particles 5 in the fine particle layer 4.

In the same manner as the examples described above, the spin coating method was used as a method for formation of the fine particle layer 4, and a solution in which the particles were dispersed was prepared in the following procedure First, 3 mL of toluene solvent was poured into a 10 mL reagent bottle, and then 0.5 g of cross-linked polymer fine particles manufactured by JSR Corporation (SX8743: average diameter of 50 nm) were added. The reagent bottle was set in an ultrasonic dispersion device for dispersion of the cross-linked polymer fine particles. Thereafter, 0.055 g of silver nanoparticles manufactured by Ouyou Nano Laboratory K.K. were added and the ultrasonic dispersion was carried out in the same manner as the dispersion of the cross-linked polymer fine particles. As a result, a fine-particle dispersion solution was obtained.

By the spin coating method under the above-described condition for film formation, film formation was repeated three times on a surface of the SUS substrate 2 so as to give the fine particle layer 4 having a thickness of approximately 1000 nm. On the surface of the fine particle layer 4, the upper electrode 3 having a thickness of 40 nm was formed by use of gold as a material. As a result, an electron emitting element was obtained. Electron emission was also observed from the electron emitting element of the present example.

EXAMPLE 5

Figure 8:
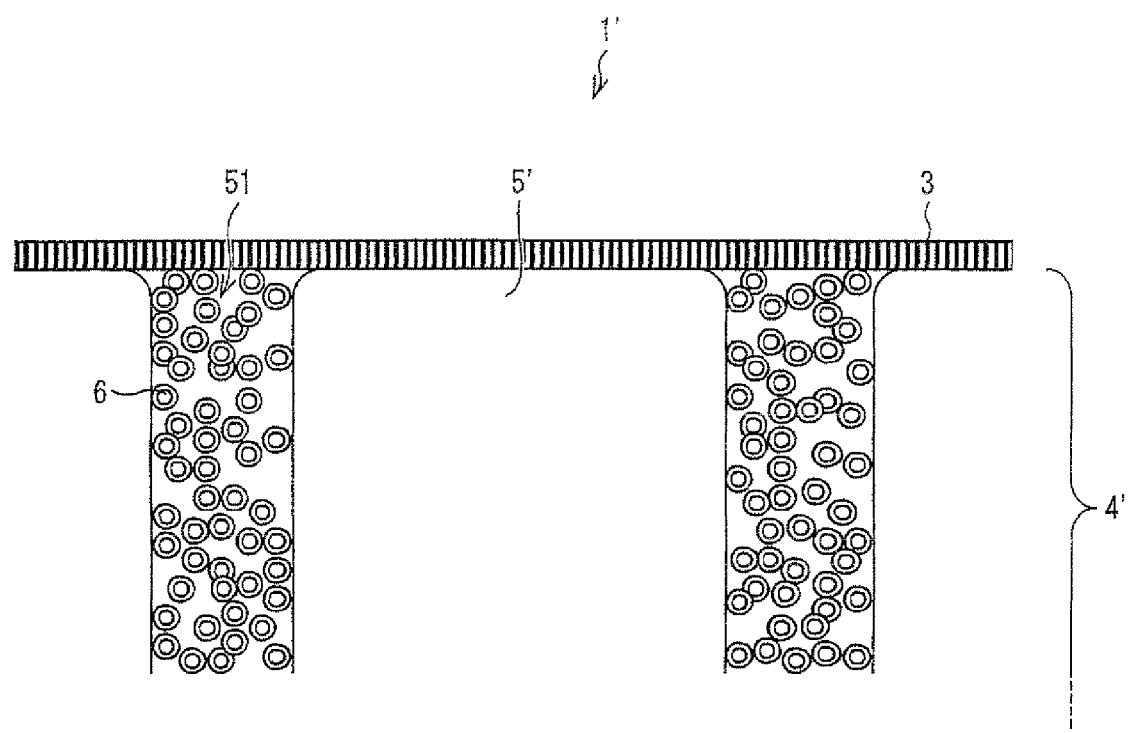
FIG. 8 is an enlarged view illustrating a cross section in the vicinity of an electron acceleration layer in another configuration of an electron emitting element of the present invention.

In the present example, an electron emitting element was produced by use of a sheet substrate made of an organic polymer serving as an insulating material (corresponding to the insulating fine particles 5 in the fine particle layer 4 in the above Examples 1 through 4) in an electron acceleration layer. FIG. 8 is a schematic view magnifying a cross section in the vicinity of an electron acceleration layer 4' in an electron emitting element 1' that has another example of a configuration of the electron emitting element of the present invention. In the present example, an insulating material 5' was in the form of a sheet and laminated on a substrate 2. This insulating material 5' includes a plurality of holes 51 penetrating the sheet in a laminating direction.

A 30 mm square SUS substrate was used as the substrate 2. On the substrate 2, a polycarbonate sheet having a thickness of 6 μm was laminated as the insulating material 5'. The polycarbonate sheet includes six holes (through holes) 51 of ϕ50 nm per 1 μm², and an aperture ratio was approximately 1.2%. The holes 51 penetrate the sheet in a sheet laminating direction.

Next, gold nanoparticles (average particle diameter of 10 nm, inclusive of 1 nm of insulating-coating water soluble polymer) serving as the metal fine particles 6 whose surfaces an insulating material was attached to were dispersed at a concentration of 2.5 mmol/L in water that was a solvent. A proper amount of this solution was dropped on the polycarbonate sheet so as to permeate the holes 51, and then dried naturally. On the polycarbonate sheet (electron acceleration layer 4') in which gold nanoparticles were filled in the holes 51, a layer having a thickness of 12 nm was formed, by use of gold, as the upper electrode 3 by magnetron sputtering. An area of the upper electrode 3 was 0.28 cm$^2$.

In the measurement system illustrated in FIG. 3, an electron emission experiment of the electron emitting element 1' produced as described above was conducted, and current caused by electron emission was observed.

In the present example, the metal fine particles 6 whose surfaces an insulating material was attached to were caused to permeate the holes 51 by dropping of the solution. Without dispersing the metal fine particles 6 in the solvent, it is also possible to cause the metal fine particles 6 to permeate the holes by blowing, suctioning, or rubbing in the metal fine particles 6. []

Embodiment 2

Figure 9:
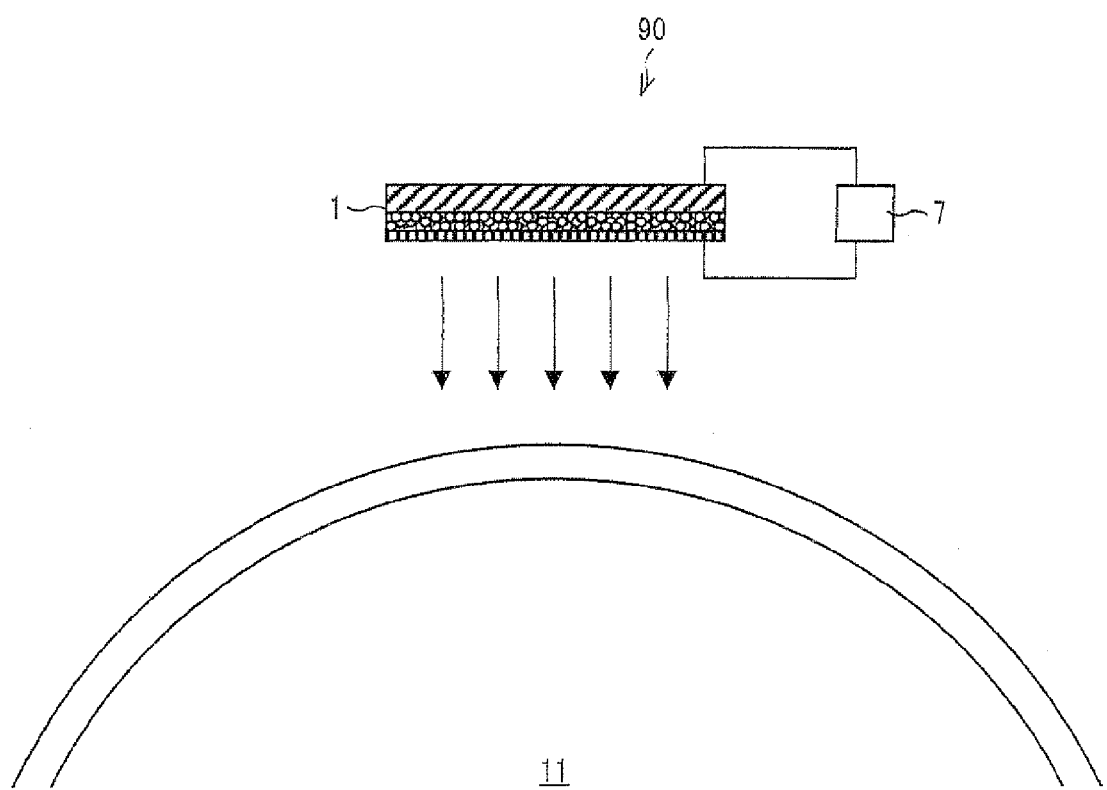
FIG. 9 is a diagram illustrating an example of a charging device including an electron emitting element of the present invention.

FIG. 9 shows an example of a charging device 90 of the present invention including an electron emitting element 1 of the present invention described in Embodiment 1. The charging device 90 includes the electron emitting element 1 and a power supply 7 for applying a voltage to the electron emitting element 1. The charging device 90 is used for electrically charging a photoreceptor 11. An image forming apparatus of the present invention includes the charging device 90. In the image forming apparatus of the present invention, the electron emitting element 1 serving as the charging device 90 is provided so as to face the photoreceptor 11 to be charged. Application of a voltage causes the charging device 90 to emit electrons so that the photoreceptor 11 is electrically charged. In the image forming apparatus of the present invention, other than the charging device 90, known members can be used. The electron emitting element 1 serving as the charging device 90 is preferably provided so as to be, for example, 3 mm to 5 mm apart from the photoreceptor 11. Further, it is preferable that a voltage of approximately 25 V is applied to the electron emitting element 1. An electron acceleration layer of the electron emitting element 1 should be configured such that 1 μA/cm$^2$ of electrons are emitted per unit of time in response to application of a voltage of 25V, for example.

Even when the electron emitting element 1 which is used as the charging device 90 is operated in the atmosphere, electric discharge does not occur. Therefore, the charging device 90 generates no ozone. Ozone is harmful to human bodies, and therefore regulated in various environmental standards. Even if ozone is not discharged to the outside of the apparatus, ozone deteriorates by oxidation an organic material such as the photoreceptor 1 or a belt inside the apparatus. However, such a problem can be solved by that the electron emitting element 1 of the present invention is used as the charging device 90 and further the image forming apparatus includes such a charging device 90.

Further, the electron emitting element 1 serving as the charging device 90 is configured as a planar electron source. Therefore, the electron emitting element 1 is capable of charging the photoreceptor 11 on an area that has a width in a rotation direction. This provides many chances for charging a section of the photoreceptor 11. Therefore, the charging device 90 can perform a more uniform electric charging as compared to a wire charging device electrically charging line by line a section on the photoreceptor 11. Further, the charging device 90 has an advantage such that the applied voltage is approximately 10 V which is far lower than that of a corona discharge device which requires an applied voltage of a few kV.

Embodiment 3

Figure 10:
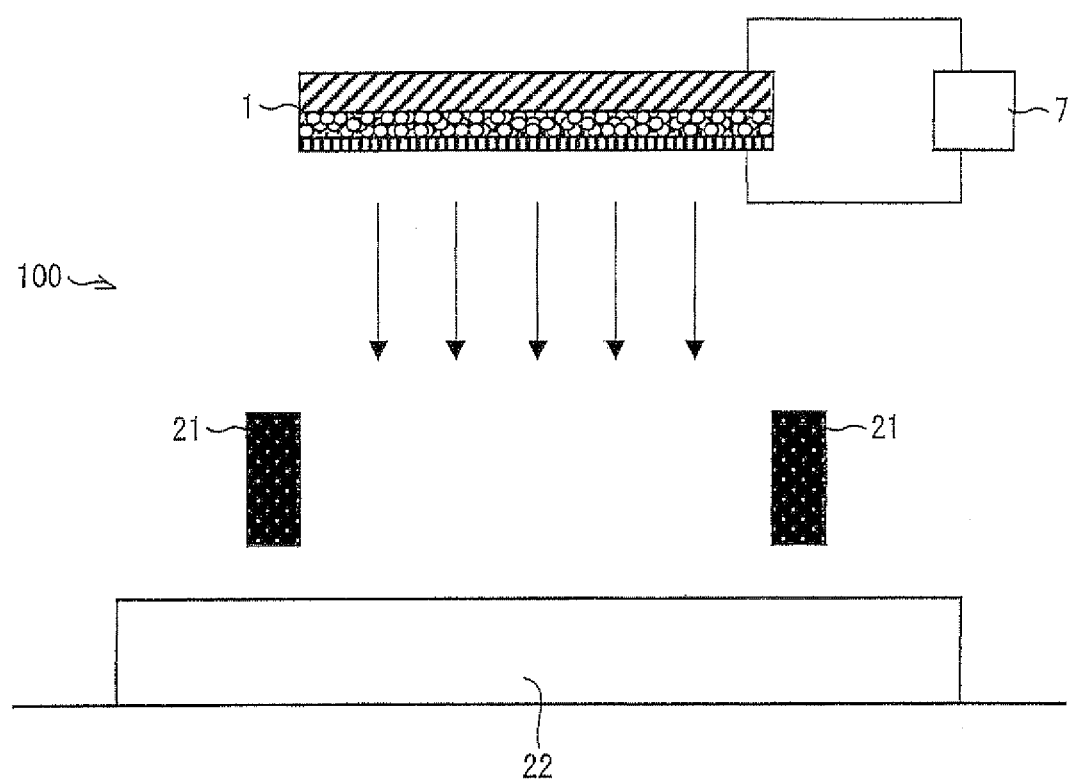
FIG. 10 is a diagram illustrating an example of an electron-beam curing device including an electron emitting element of the present invention.

FIG. 10 shows an example of an electron-beam curing device 100 of the present invention including an electron emitting element 1 of the present invention which is described in Embodiment 1. The electron-beam curing device 100 includes the electron emitting element 1, a power supply 7 for applying a voltage to the electron emitting element 1, and an accelerating electrode 21 for accelerating electrons. In the electron-beam curing device 100, the electron emitting element 1 serving as an electron source emits electrons, and the electrons emitted are accelerated by the accelerating electrode 21 so that the electrons collide with a resist 22. Energy necessary for curing the general resist 22 is not more than 10 eV. In terms of energy, the accelerating electrode is not necessary. However, a penetration depth of an electron beam is determined by a function of energy of electrons. For example, in order to entirely cure the resist 22 having a thickness of 1 μm, an accelerating voltage of approximately 5 kV is required.

In a conventional general electron-beam curing device, an electron source is sealed in vacuum and caused to emit electrons by application of a high voltage (in a range of 50 kV to 100 kV). The electrons are taken out through an electron window and used for irradiation. According to the above electron emission method, when the electrons pass through the electron window, loss of a large amount of energy occurs in the electrons. Further, the electrons that reach the resist pass through the resist in the thickness direction because the electrons have high energy. This decreases energy utilization efficiency. In addition, because an area on which electrons are thrown at a time is small and irradiation is performed in a manner drawing with dots, throughput is low.

On the other hand, the electron-beam curing device of the present invention including the electron emitting element 1 of the present invention can work in the atmosphere, so that the electron-beam curing device does not need to be sealed in vacuum. Further, the electron-beam curing device is free from energy loss because the electrons do not pass through the electron window. This allows reducing an applied voltage. Moreover, since the electron-beam curing device has a planar electron source, the throughput increases significantly. In a case where electrons are emitted in accordance with a pattern, it is possible to perform a maskless exposure.

Embodiment 4

Figure 11:
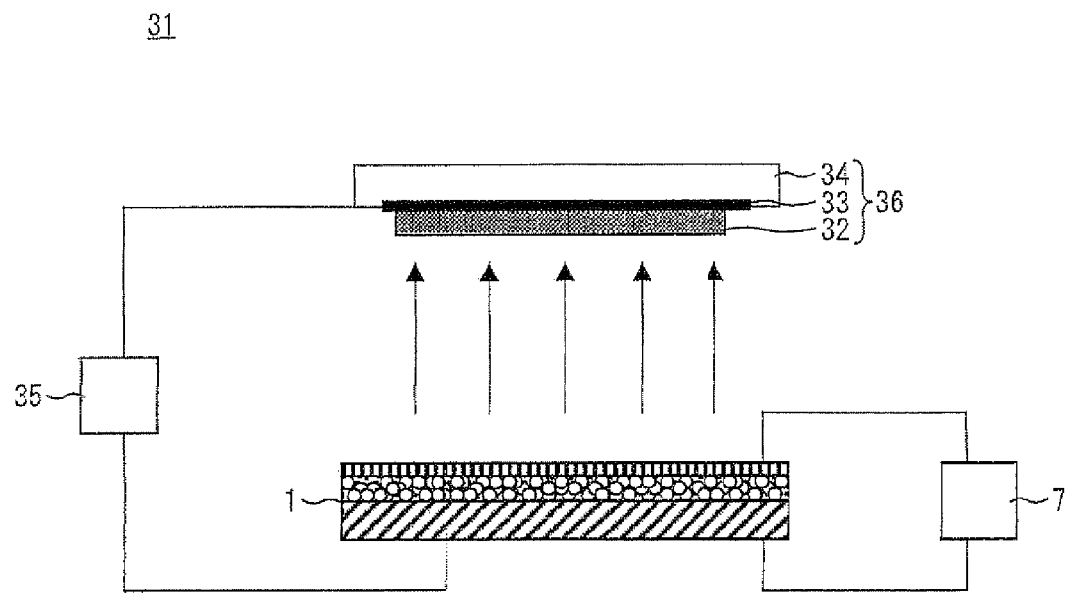
FIG. 11 is a diagram illustrating an example of a light emitting device including an electron emitting element of the present invention.
Figure 12:
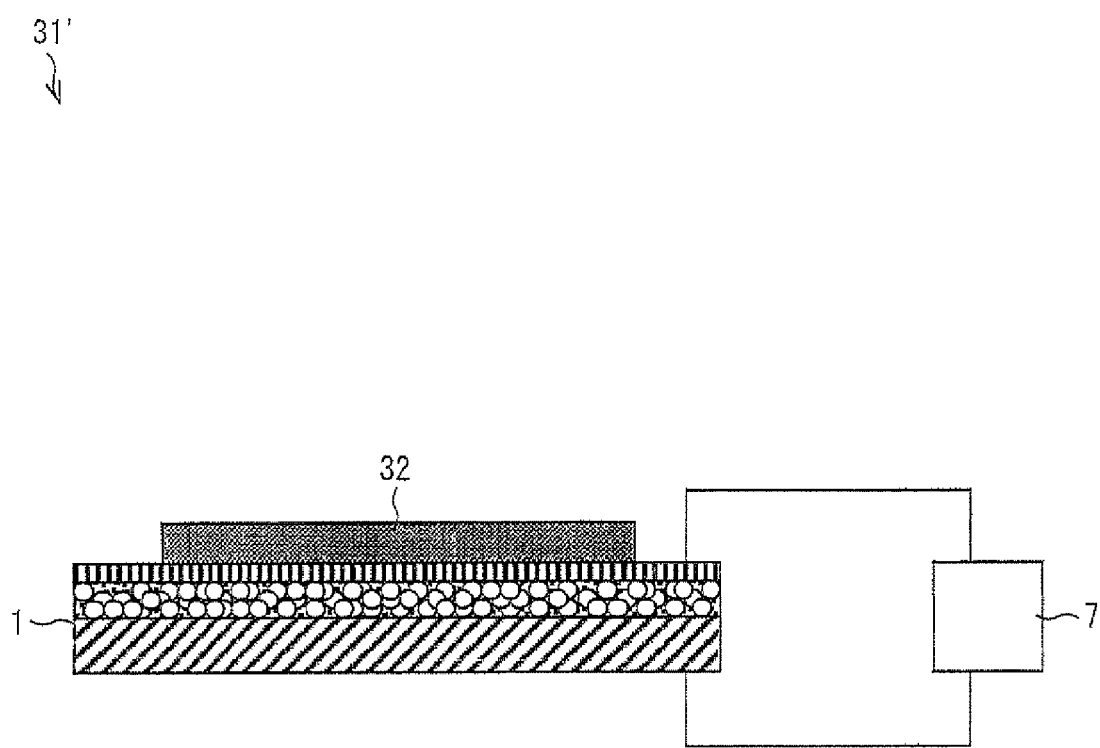
FIG. 12 is a diagram illustrating another example of a light emitting device including an electron emitting element of the present invention.
Figure 13:
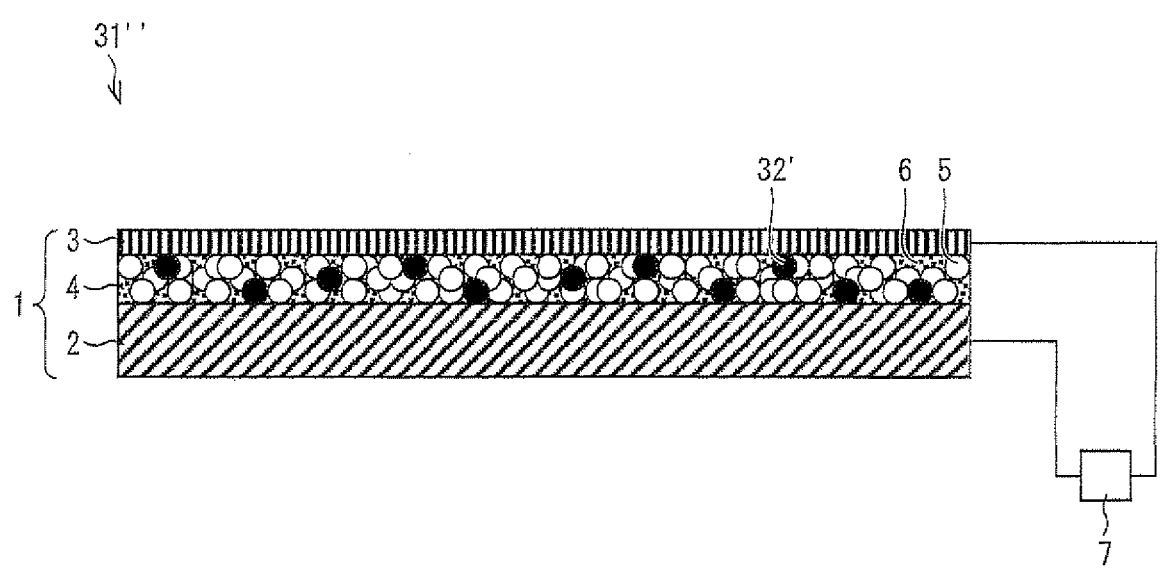
FIG. 13 is a diagram illustrating still another example of a light emitting device including an electron emitting element of the present invention.

FIG. 11 through FIG. 13 show examples of respective light emitting devices of the present invention each including an electron emitting element 1 of the present invention which is described in Embodiment 1.

A light emitting device 31 illustrated in FIG. 11 includes an electron emitting element 1, a power supply 7 for applying a voltage to the electron emitting element 1, and a light-emitting section 36 provided in a position that is apart from the electron emitting element 1 and that faces the electron emitting element 1. The light-emitting section 36 has a laminated structure including a glass substrate 34 serving as a base material, an ITO film 33, and a luminous body 32.

Suitable materials of the luminous body 32 are materials that are excited by electrons and that correspond to red light emission, green light emission, and blue light emission, respectively. Examples usable as such materials corresponding to red are $Y_2O_3$:Eu, and (Y, Gd) $Bo_3$:Eu; examples usable as such materials corresponding to green are $Zn_2SiO_4$:Mn and $BaAl_{12}O_{19}$:Mn; and an example usable as such materials corresponding to blue is $BaMgAl_{10}O_{17}$:$Eu^{2+}$. A film of the luminous body 32 is formed on the ITO film 33 which is formed on the glass substrate 34. It is preferable that the luminous body 32 is approximately 1 μm in thickness. Further, the ITO film 33 may have any thickness as long as the ITO film 33 can reliably have electric conductivity at the thickness. In the present embodiment, the ITO film 33 is set to 150 nm in thickness.

For forming a film of the luminous body 32, a mixture of epoxy resin serving as a binder and luminous-body particles is prepared, and a film of the mixture may be formed by a known method such as a bar coater method or a dropping method.

In this embodiment, in order to increase a brightness of light emitted from the luminous body 32, it is necessary to accelerate, toward the luminous body, electrons which are emitted from the electron emitting element 1. Accordingly, between the substrate 2 of the electron emitting element 1 and the ITO film 33 of the light-emitting section 36, a power supply 35 should be provided in order to form an electric field for accelerating the electrons. In this case, it is preferable that: (i) a distance between the luminous body 32 and the electron emitting element 1 is 0.3 mm to 1 mm; a voltage applied by the power supply 7 is 18V; and a voltage applied by the power supply 35 is 500 V to 2000 V.

A light emitting device 31' shown in FIG. 12 includes an electron emitting element 1, a power supply 7 for applying a voltage to the electron emitting element 1, and a luminous body 32. In the light emitting device 31', the luminous body 32 is a planar luminous body which is provided on a surface of the electron emitting element 1. In the present embodiment, a layer of the luminous body 32 is formed on a surface of the electron emitting element 1, in such a manner that a mixture of epoxy resin serving as a binder and luminous-body particles is prepared as described above and a film of the mixture is formed on the surface of the electron emitting element 1. Note that, because the electron emitting element 1 itself has a structure which is vulnerable to external force, the element may be damaged as a result of use of the bar coater method. Therefore, it is preferable to use the dropping method or the spin coating method.

A light emitting device 31" shown in FIG. 13 includes an electron emitting element 1, and a power supply 7 for applying a voltage to the electron emitting element 1. Further, in a fine particle layer 4 of the electron emitting element 1, fluorescent fine particles as a luminous body 32' are mixed in. In this case, the luminous body 32' may be configured to also serve as the insulating fine particles 5. Generally, however, the luminous-body fine particles have a low electric resistance. As compared to electric resistance of the insulating fine particles 5, the electric resistance of the luminous-body fine particles is clearly lower. Therefore, when the luminous-body fine particles are mixed in replacement of the insulating fine particles 5, an amount of the luminous-body fine particles should be suppressed to a small amount. For example, when spherical silica particles (average diameter of 110 nm) are used as the insulating fine particles 5 and ZnS:Mg (average diameter of 500 nm) is used as the luminous-body fine particles, an appropriate mixture ratio by weight of the insulating fine particles 5 and the luminous-body fine particles is approximately 3:1.

In the above light emitting devices 31, 31', arid 31", electrons emitted from the electron emitting element 1 are caused to collide with the corresponding fluorescent bodies or 32 so that light is emitted. Because the electron emitting element 1 can emit electrons in the atmosphere, the light emitting devices 31, 31', and 31" can work in the atmosphere. However, sealed in vacuum, the light emitting devices 31, 31', and 31" can work more efficiently because an electron emission current increases.

Figure 14:
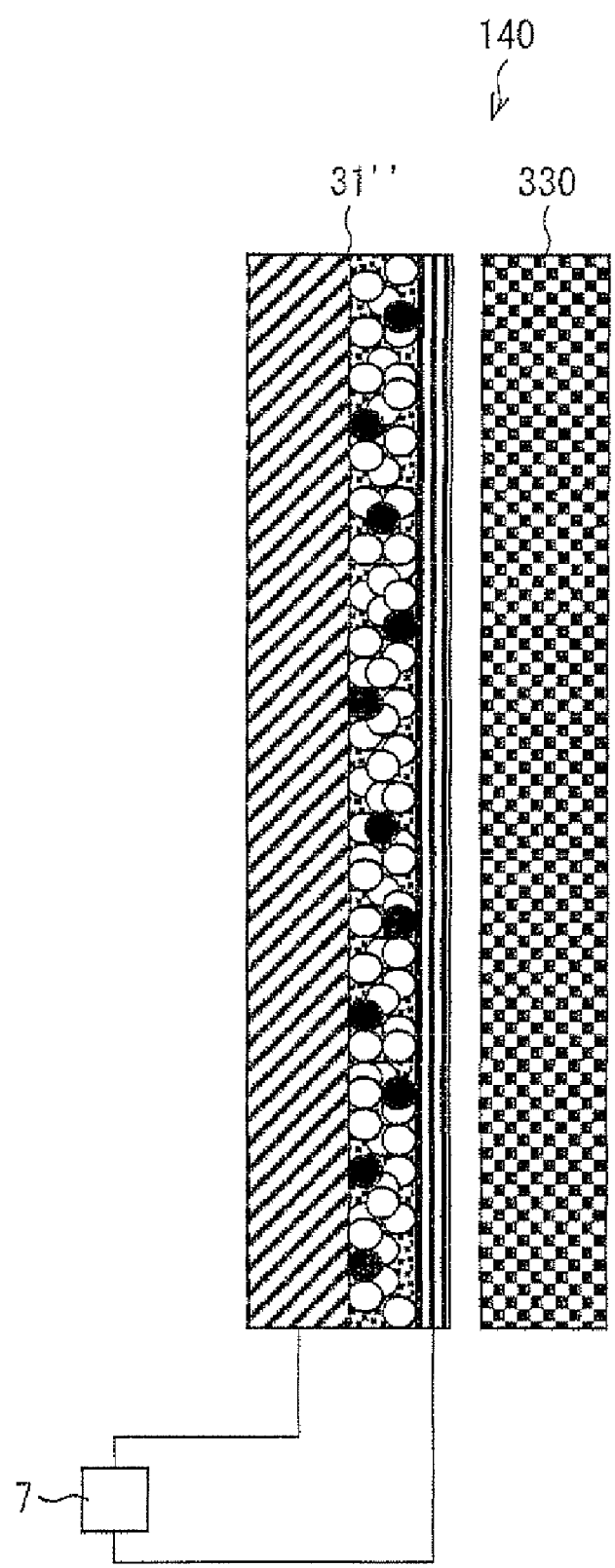
FIG. 14 is a diagram illustrating an example of an image forming apparatus which includes a light emitting device including an electron emitting element of the present invention.

FIG. 14 illustrates an example of an image display device of the present invention which includes a light emitting device of the present invention. An image display device 140 illustrated in FIG. 14 includes a light emitting device 31" illustrated in FIG. 13, and a liquid crystal panel 330. In the image display device 140, the light emitting device 31" is provided behind the crystal panel 330 and used as a backlight. In cases where the light emitting device 31" is used in the image display device 140, it is preferable that a voltage of 20 V to 35 V is applied to the light emitting device 31". The light emitting device 31" should be configured to emit, for example, 10 μA/$cm^2$ of electrons per unit of time at the voltage of 20 V to 35 V. Further, it is preferable that a distance between the light emitting device 31" and the liquid crystal panel 330 is approximately 0.1 mm.

In cases where light emitting devices 31 illustrated in FIG. 11 are used as an image display device of the present invention, the light emitting devices 31 may be arranged in a matrix so as to form a shape that allows the light emitting devices 31 themselves serving as an FED to form and display an image. In such cases, it is preferable that a voltage applied to the light emitting device 31 is in a range of 20 V to 35 V. The light emitting device 31 should be configured to emit, for example, 10 μA/$cm^2$ of electrons per unit of time, at the applied voltage in the range of 20 V to 35 V.

Embodiment 5

Figure 15:
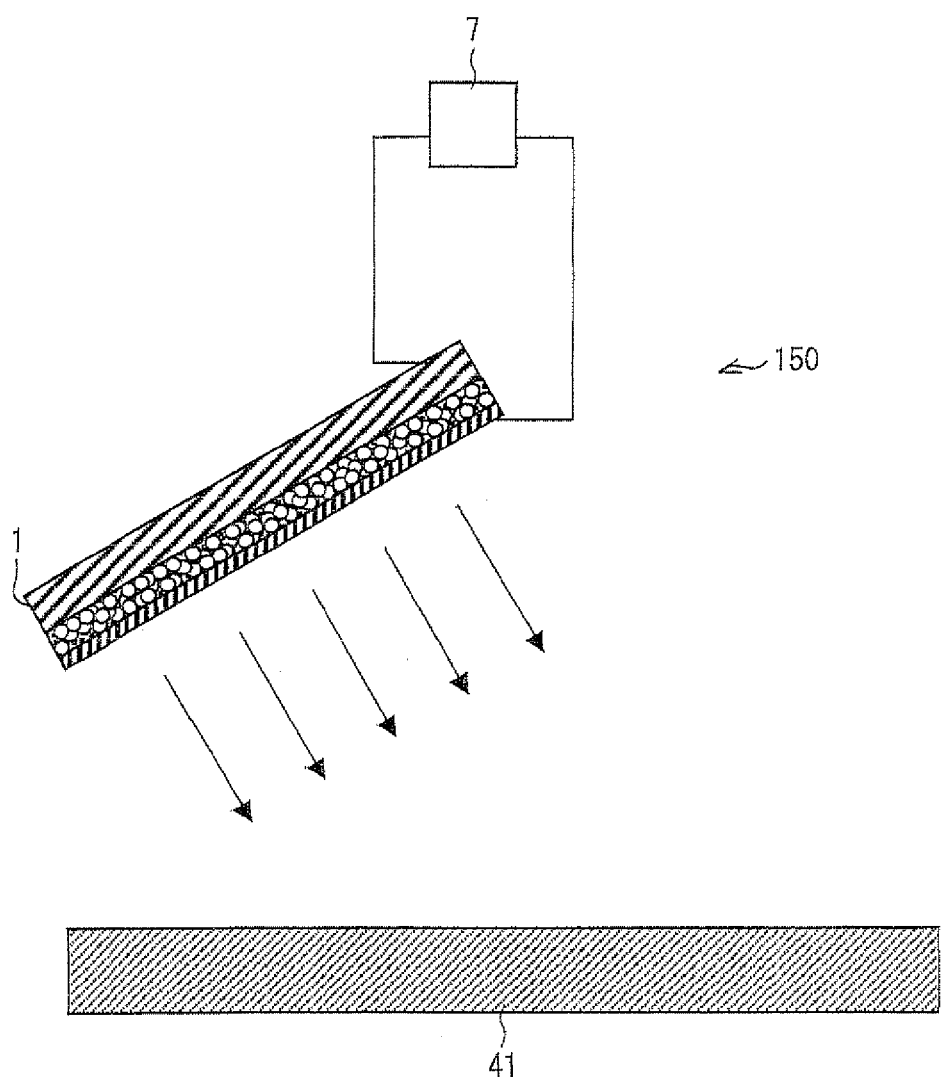
FIG. 15 is a diagram illustrating an example of an air blowing device including an electron emitting element of the present invention and a cooling device which includes the air blowing device.
Figure 16:
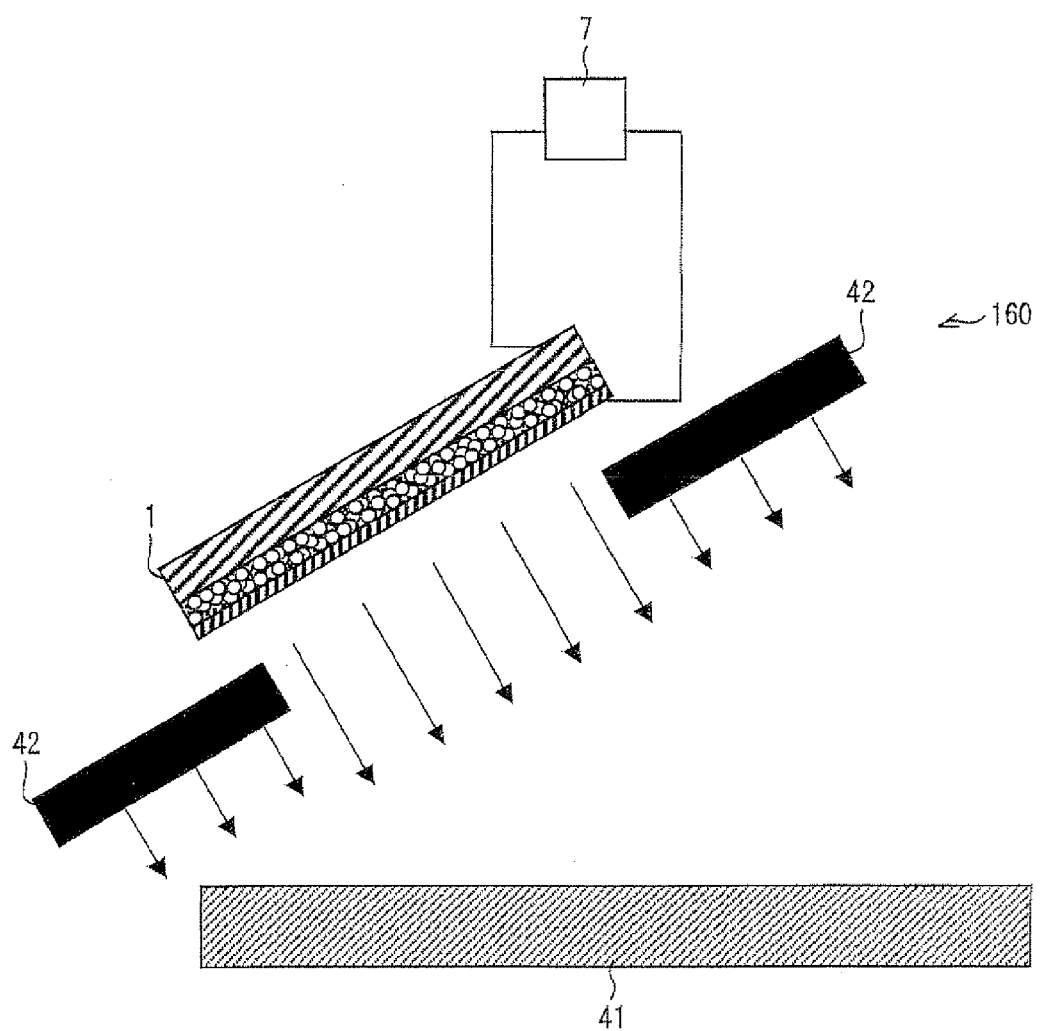
FIG. 16 is a diagram illustrating another example of an air blowing device including an electron emitting element of the present invention and a cooling device which includes the air blowing device.

FIG. 15 and FIG. 16 show examples of an air blowing device of the present invention including an electron emitting element 1 of the present invention described in Embodiment 1. The following explanation deals with a case where the air blowing device of the present invention is used as a cooling device. However, application of the air blowing device is not limited to a cooling device.

An air blowing device 150 illustrated in FIG. 15 includes an electron emitting element 1, and a power supply 7 for applying a voltage to the electron emitting element 1. In the air blowing device 150, the electron emitting element 1 emits electrons toward an object 41 to be cooled so that ion wind is generated and the object 41 electrically grounded is cooled. In cases where the object 41 is cooled, it is preferable that a voltage of approximately 18 V is applied to the electron emitting element 1 and, at this applied voltage of approximately 18 V, the electron emitting element 1 emits, for example, 1 μA/$cm^2$ of electrons per unit of time in the atmosphere.

In addition to the arrangement of the air blowing device 150 illustrated in FIG. 15, an air blowing device 160 illustrated in FIG. 16 further includes a blowing fan 42. In the air blowing device 160 illustrated in FIG. 16, an electron emitting element 1 emits electrons toward an object 41 to be cooled and the blowing fan 42 blows the electrons toward the object 41 so that the object 41 electrically grounded is cooled down by generation of ion wind. In this case, it is preferable that an air volume generated by the blowing fan 42 is in a range of 0.9 L to 2 L per minute per square centimeter.

Now, a case where the object 41 is to be cooled by blowing air is considered. In a case where the object 41 is cooled by blowing only the atmospheric air with use of a fan or the like as in a conventional air blowing device or a conventional cooling device, cooling efficiency is low because a flow rate on a surface of the object 41 becomes 0 and the air in a section from which heat should be dissipated the most is not replaced. However, in cases where electrically charged particles such as electrons or ions are included in the air sent to the object 41, the air sent to the object 41 is attracted to the surface of the object 41 by electric force in the vicinity of the object 41. This makes it possible to replace the air in the vicinity of the surface of the object 41. In the present embodiment, because the air blowing devices 150 and 160 of the present invention blow air including electrically charged particles such as electrons or ions, the cooling efficiency is significantly improved.

Figure 17:
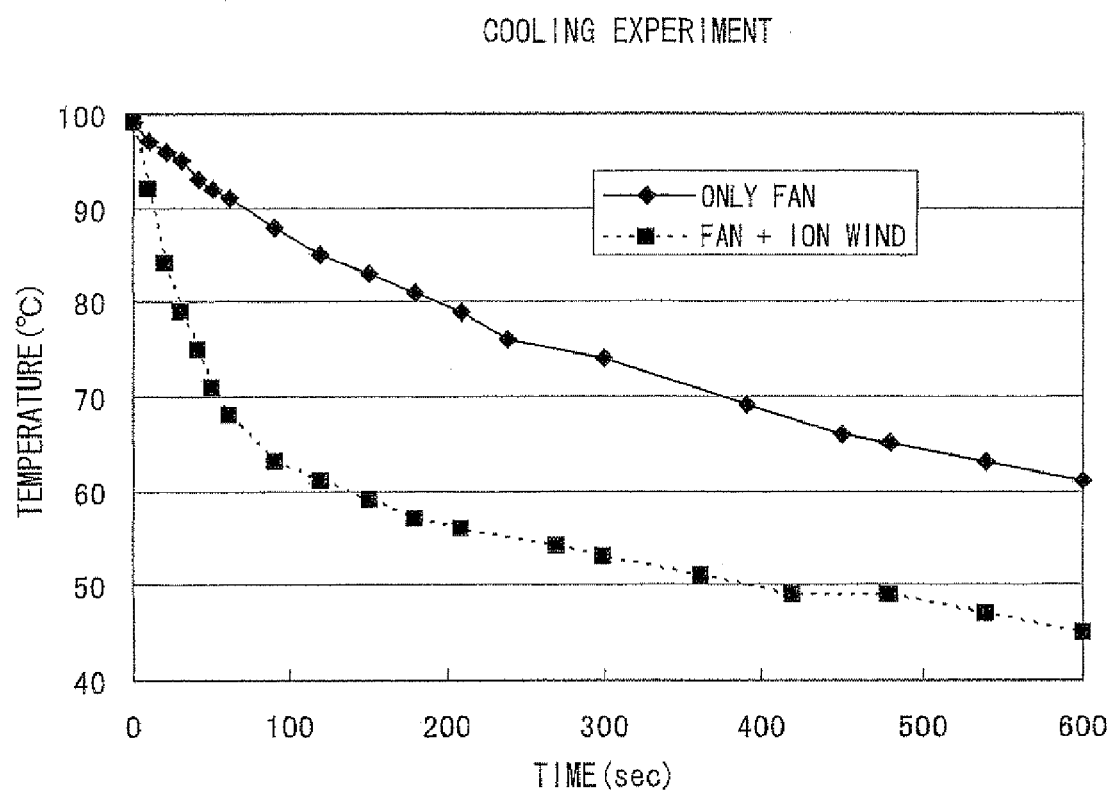
FIG. 17 is a graph showing a comparison of a case where the atmospheric air is blown to an object to be cooled and a case where the air including electrons and ions is blown to the object to be cooled.

FIG. 17 is a graph showing comparison of (i) surface temperatures of the object 41 in a case where only the atmospheric air is sent to the object 41 and (ii) surface temperatures of the object 41 in a case where the air including electrons and ions is sent to the object 41. FIG. 17 shows that blowing the air including electrons and ions increases the cooling efficiency.

As described above, an electron emitting element of the present invention including an electrode substrate and a thin-film electrode, the electron emitting element (1) accelerating electrons between the electrode substrate and the thin-film electrode by voltage application between the electrode substrate and the thin-film electrode and (ii) emitting the electrons from the thin-film electrode, the electron emitting element includes: an electron acceleration layer provided between the electrode substrate and the thin-film electrode, the electron acceleration layer including: electrically conductive fine particles having high resistance to oxidation, the electrically conductive fine particles being made of a conductor; and an insulating material which is larger in size than the electrically conductive fine particles.

In addition to the above arrangement, in the electron emitting element of the present invention, the electrically conductive fine particles may be made of a noble metal. When the electrically conductive fine particles are made of a noble metal as described above, it is possible to prevent element degradation (e.g., oxidization caused by oxygen in the atmosphere) of the electrically conductive fine particles. This can extend a life of the electron emitting element.

In addition to the above arrangement, in the electron emitting element of the present invention, the conductor which the electrically conductive fine particles are made of should include at least one of gold, silver, platinum, palladium, and nickel. When the conductor that the electrically conductive fine particles are made of includes at least one of gold, silver, platinum, palladium, and nickel, it is possible to more effectively prevent element degradation (e.g., oxidization caused by oxygen in the atmosphere) of the electrically conductive fine particles. This can more effectively extend a life of the electron emitting element.

In addition to the above arrangement, in the electron emitting element of the present invention, the electrically conductive fine particles should have a smaller average diameter than that of the insulating material because conductivity needs to be controlled. It is preferable that the electrically conductive fine particles have an average diameter in a rage of 3 nm to 10 nm. In a case where the average diameter of the electrically conductive fine particles is smaller than that of the insulating material and the average diameter is set preferably in the range of 3 nm to 1.0 nm, a conductive path made of the electrically conductive fine particles is not formed the electron acceleration layer. As a result, dielectric breakdown becomes hard to occur in the electron acceleration layer. Though there are a lot of unexplained points in regard to a principle, ballistic electrons are efficiently generated by use of the metal fine particles having the particle diameter within the above range.

In addition to the above arrangement, in the electron emitting element of the present invention, the insulating material should include an organic polymer or at least one of $SiO_2$, $Al_2O_3$, and $TiO_2$. When the insulating material includes an organic polymer or at least one of $SiO_2$, $Al_2O_3$, and $TiO_2$, it is possible to control a resistance value of the electron acceleration layer within a desired range because of high insulation properties of the above substances. In particular, in a case where an oxide ($SiO_2$, $Al_2O_3$, and $TiO_2$) is used as the insulating material and a conductor having a high resistance to oxidation is used as the electrically conductive fine particles, element degradation due to oxidization caused by oxygen in the atmosphere becomes more difficult to occur. This makes it possible to provide more significantly an effect of causing the electron emitting element to steadily work in the atmosphere.

In the present invention, the insulating material may be made of fine particles and an average diameter of the fine particles is preferably in a range of 10 nm to 1000 nm and more preferably, in a range of 12 nm to 110 nm. In this case, respective diameters of the insulating fine particles may be broadly distributed with respect to the average particle diameter. For example, the fine particles having an average diameter of 50 nm may have a particle diameter distribution in a range of 20 nm to 100 nm. In a case where the average diameter of the insulating fine particles is arranged to be preferably in a range of 10 nm to 1000 nm and more preferably in a range of 12 nm to 110 nm, it is possible to efficiently dissipate Joule heat that occurs at the time when current flows inside the element by efficiently conducting heat from the inside of the electrically conductive fine particles to the outside of the electrically conductive fine particles that are smaller in size than the insulating material. This makes it possible to prevent the electron emitting element from being broken down by heat. Further, this also makes it possible to easily control a resistance value of the electron acceleration layer.

In addition to the above arrangement, in the electron emitting element of the present invention, it is preferable that a ratio of the insulating material in the electron acceleration layer is in a range of 80% by weight to 95% by weight. When the ratio of the insulating material in the electron acceleration layer is in the range of 80% by weight to 95% by weight, it is possible to properly increase a resistance value in the electron acceleration layer. Accordingly, the electron emitting element is prevented from being broken down due to flow of a large amount of electrons at a time.

In addition to the above arrangement, in the electron emitting element in the present invention, it is preferable that the electron acceleration layer has a thickness preferably in a range of 12 nm to 6000 nm and more preferably in a range of 300 nm to 6000 nm. When the thickness of the electron acceleration layer is set preferably in a range of 12 nm to 6000 nm, and more preferably in a range of 300 nm to 6000 nm, it becomes possible to make the thickness of the electron acceleration layer even and to control a resistance of the electron acceleration layer in a thickness direction of the layer. This allows emitting electrons uniformly from an entire surface of the electron emitting element and also allows efficiently emitting electrons to the outside of the element.

In addition to the above arrangement, in the electron emitting element of the present invention, the thin-film electrode should include at least one of gold, silver, carbon, tungsten, titanium, aluminum, and palladium. When the thin film electrode includes at least one of gold, silver, carbon, tungsten, titanium, aluminum, and palladium, tunneling of electrons generated in the electron acceleration layer can become efficient due to a low work function of the above substances. As a result, a larger number of high-energy electrons can be emitted to the outside of the electron emitting element.

In addition to the above arrangement, in the electron emitting element of the present invention, another insulating material may be present around each of the electrically conducive fine particles, the another insulating material being smaller in size than the electrically conductive fine particles. When another insulating material is present around each of the electrically conducive fine particles and the another insulating material is smaller in size than the electrically conductive fine particles, the presence of the another insulating material contributes to improvement in dispersibility of the electrically conductive fine particles in a dispersion solution at the time when the element is produced. In addition, it becomes possible to more effectively prevent element degradation (e.g., oxidization caused by oxygen in the atmosphere) of the electrically conductive fine particles. This makes it possible to more effectively extend a life of the electron emission element.

In addition to the above arrangement, in the electron emitting element of the present invention, the another insulating material should include at least one of alcoholate, aliphatic acid, and alkanethiol, the another insulating material being present around the electrically conductive fine particles and smaller in size than the electrically conductive fine particles. When the another insulating material includes at least one of alcoholate, aliphatic acid, and alkanethiol and the another insulating material is present around the electrically conductive fine particles and smaller in size than the electrically conductive fine particles, the presence of the another insulating material contributes to improvement in dispersibility of the electrically conductive fine particles in a dispersion solution at the time when the element is produced. As a result, abnormal current path formation caused by an aggregate of the electrically conductive fine particles becomes difficult to occur. In addition, because the above case prevents a change in composition of particles due to oxidation of the electrically conductive fine particles themselves present around the insulating material, no influence on electron emission characteristics occurs. Therefore, a life of the electron emitting element can be effectively extended.

In the electron emitting element of the present invention, the another insulating material smaller in size than the electrically conductive fine particles is present around the electrically conductive fine particles. This another insulating material is present as an adhering substance and adheres to respective surfaces of the electrically conductive fine particles. This adhering substance may coat respective surfaces of the electrically conductive fine particles, as an aggregate of the particles each having a smaller diameter than the average diameter of the electrically conductive fine particles. In this way, the another insulating material which is present around the electrically conductive fine particles and smaller than the electrically conductive fine particles adheres to the respective surfaces of the electrically conductive fine particles or coats, as an aggregate of the particles each having a diameter smaller than the average diameter of the electrically conductive fine particles, the respective surfaces of the electrically conductive fine particles. This presence of the another insulating material contributes to improvement in dispersibility of the electrically conductive fine particles in the dispersion solution at the time when the element is produced. Accordingly, abnormal current path formation caused by an aggregate of the electrically conductive fine particles becomes difficult to occur. In addition, because the above case prevents a change in composition of particles due to oxidation of the electrically conductive fine particles present around the insulating material, no influence on electron emission characteristics occurs. Therefore, a life of the electron emitting element can be more effectively extended.

Further, in the electron emitting element of the present invention, a layer of the insulating material is formed on the electrode substrate, the insulating material being larger in size than the electrically conductive fine particles, the layer including a plurality of holes penetrating the layer in a thickness direction of the layer, and the electrically conductive fine particles are contained in the holes. The insulating material that is formed in a sheet form exists not as an aggregate of fine particles but as a solid mass, so that the insulating material works as an insulator through which current does not flow. On the other hand, in a section where the electrically conductive fine particles are provided in the holes, a surface resistance decreases and, only in the section, current flows easily. As a result, electron emission occurs only in the section where the electrically conductive fine particles are provided in the holes. This method does not require a production process for uniformly applying the dispersion solution in which the fine particles are dispersed. This allows easy formation of an electron emitting element having a large area.

An electron emitting device of the present invention includes at least one of the above electron emitting elements, and a power supply for applying a voltage between the electrode substrate and the thin-film electrode.

According to the above arrangement, it is possible to steadily emit electrons not only in vacuum but also in the atmosphere. Further, electrons can be emitted without generating harmful substances such as ozone, NOx, and the like.

Further, it is possible to provide a light emitting device (i) that does not need to be sealed in vacuum, (ii) that has a long life even in the atmosphere, and (iii) is capable of performing planar light emission, by using the electron emitting element of the present invention in the light emitting device or an image display device including the electron emitting device.

Further, use of an electron emitting element of the present invention in an air blowing device or a cooling device makes it possible to perform cooling with high efficiency by utilizing a slip effect on a surface of an object to be cooled. Because such cooling is not accompanied by electric discharge, no harmful substances such as ozone and NOx are generated.

Further, by using the electron emitting element of the present invention in a charging device and an image forming apparatus including the charging device, it becomes possible to charge a body to be charged while (i) no electric discharge occurs and (ii) no harmful substances such as ozone and NOx are generated.

Further, use of an electron emitting element of the present invention in an electron-beam curing device makes it possible to perform electron-beam curing area by area. This makes it possible to achieve a maskless process, thereby achieving low cost and high throughput.

In order to solve the problems described above, a method for producing an electron emitting element of the present invention including an electrode substrate and, a thin-film electrode, the electron emitting element (i) accelerating electrons between the electrode substrate and the thin-film electrode by voltage application between the electrode substrate and the thin-film electrode and (ii) emitting the electrons from the thin-film electrode, the method includes the steps of: forming an electron acceleration layer which includes (i) an electrically conductive fine particles having high resistance to oxidation, the electrically conductive fine particles being made of a conductor, and (ii) an insulating material which is larger in size than the electrically conductive fine particles; and forming the thin-film electrode on the electron acceleration layer.

According to the above method, it becomes possible to produce an electron emitting element that steadily emits electrons not only in vacuum but also in the atmosphere while producing substantially no harmful substances such as ozone, NOx, and the like.

Further, the step of forming the electron acceleration layer may include the sub-steps of: mixing the electrically conductive fine particles and the insulating material in a solvent so as to form a mixed material; applying the mixed material on the electrode substrate; and drying the mixed material applied in the step of applying the mixed material.

Alternatively, the step of forming the electron acceleration layer includes the sub-steps of: laminating the insulating material on the electrode substrate, the insulating material being a sheet insulating material including a plurality of holes penetrating the sheet insulating material in a laminating direction; and filling the electrically conductive fine particles in the plurality of holes. As a further alternative, the step of forming the electron acceleration layer includes the sub-steps of: forming a layer of the insulating material on the electrode substrate; forming, in the insulating material, a plurality of holes penetrating the layer in a thickness direction of the layer; and filling the electrically conductive fine particles in the plurality of holes.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

An electron emitting element of the present invention is not associated with electric discharge and is capable of steadily work in the atmosphere. Therefore, the electron emitting element of the present invention can be suitably applied, for example, (i) to a charging device of image forming apparatuses such as an electrophotographic copying machine, a printer, and a facsimile; (ii) an electron-beam curing device; in combination with a luminous body, to an image display device; (iv) by utilizing ion wind generated by electrons emitted from the electron emitting element, to an air blowing device; or the like.

The invention claimed is:

1. An electron emitting element including an electrode substrate and a thin-film electrode, the electron emitting element (i) accelerating electrons between the electrode substrate and the thin-film electrode by voltage application between the electrode substrate and the thin-film electrode and (ii) emitting the electrons from the thin-film electrode, the electron emitting element comprising:
an electron acceleration layer provided between the electrode substrate and the thin-film electrode,
the electron acceleration layer including:
electrically conductive fine particles having high resistance to oxidation, the electrically conductive fine particles being made of a conductor; and
an insulating material which is larger in size than the electrically conductive fine particles.

2. The electron emitting element according to claim 1, wherein:
the electrically conductive fine particles are made of a noble metal.

3. The electron emitting element according to claim 1, wherein:
the conductor that the electrically conductive fine particles are made of includes at least one of gold, silver, platinum, palladium, and nickel.

4. The electron emitting element according to claim 1, wherein:
the electrically conductive fine particles have an average diameter in a rage of 3 nm to 10 nm.

5. The electron emitting element according to claim 1, wherein:
the insulating material includes an organic polymer or at least one of $SiO_2$, $Al_2O_3$, and $TiO_2$.

6. The electron emitting element according to claim 1, wherein:
the insulating material is made of fine particles and an average diameter of the fine particles is in a range of 10 nm to 1000 nm.

7. The electron emitting element according to claim 6, wherein:
the fine particles of the insulating material have an average diameter in a range of 12 nm to 110 nm.

8. The electron emitting element according to claim 1, wherein:
a ratio of the insulating material in the electron acceleration layer is in a range of 80% by weight to 95% by weight.

9. The electron emitting element according to claim 1, wherein:
the electron acceleration layer has a thickness in a range of 12 nm to 6000 nm.

10. The electron emitting element according to claim 9, wherein:
the electron acceleration layer has a thickness in a range of 300 nm to 6000 nm.

11. The electron emitting element according to claim 1, wherein:
the thin-film electrode includes at least one of gold, silver, carbon, tungsten, titanium, aluminum, and palladium.

12. The electron emitting element according to claim 1, wherein:
another insulating material is present around each of the electrically conducive fine particles, the another insulating material being smaller in size than the electrically conductive fine particles.

13. The electron emitting element according to claim 12, wherein:
the another insulating material includes at least one of alcoholate, aliphatic acid, and alkanethiol, the another insulating material being present around the electrically conductive fine particles and smaller in size than the electrically conductive fine particles.

14. The electron emitting element according to claim 1, wherein:
a layer of the insulating material is formed on the electrode substrate, the insulating material being larger in size than the electrically conductive fine particles, the layer including a plurality of holes penetrating the layer in a thickness direction of the layer, and
the electrically conductive fine particles are contained in the holes.

15. An electron emitting device comprising:
an electron emitting element according to claim 1; and
a power supply section for applying a voltage between the electrode substrate and the thin-film electrode.

16. A light emitting device comprising:
an electron emitting device according to claim 15; and
a luminous body.

17. An image display device comprising:
a light emitting device according to claim 16.

18. An air blowing device comprising:
an electron emitting device according to claim 15, the air blowing device blowing the electrons in an atmosphere.

19. A cooling device comprising:
an electron emitting device according to claim 15, the cooling device blowing the electrons into an atmosphere so as to cool an object to be cooled.

20. A charging device comprising:
an electron emitting device according to claim 15, the charging device charging a photoreceptor.

21. An image forming apparatus comprising a charging device according to claim 20.

22. An electron-beam curing device comprising an electron emitting device according to claim 15.

23. A method for producing an electron emitting element including an electrode substrate and a thin-film electrode, the electron emitting element (i) accelerating electrons between the electrode substrate and the thin-film electrode by voltage application between the electrode substrate and the thin-film electrode and (ii) emitting the electrons from the thin-film electrode, the method comprising the steps of:
forming an electron acceleration layer which includes (i) an electrically conductive fine particles having high resistance to oxidation, the electrically conductive fine particles being made of a conductor, and (ii) an insulating material which is larger in size than the electrically conductive fine particles; and
forming the thin-film electrode on the electron acceleration layer.

24. The method of producing the electron emitting element according to claim 23, wherein:
the step of forming the electron acceleration layer includes the sub-steps of:
mixing the electrically conductive fine particles and the insulating material in a solvent so as to form a mixed material;
applying the mixed material on the electrode substrate; and
drying the mixed material applied in the step of applying the mixed material.

25. The method of producing the electron emitting element according to claim 23, wherein:
the step of forming the electron acceleration layer includes the sub-steps of:
laminating the insulating material on the electrode substrate, the insulating material being a sheet insulating material including a plurality of holes penetrating the sheet insulating material in a laminating direction; and
filling the electrically conductive fine particles in the plurality of holes.

26. The method of producing the electron emitting element according to claim 23, wherein:
the step of forming the electron acceleration layer includes the sub-steps of:
forming a layer of the insulating material on the electrode substrate;
forming, in the insulating material, a plurality of holes penetrating the layer in a thickness direction of the layer; and
filling the electrically conductive fine particles in the plurality of holes.

* * * * *